(12) United States Patent
Matsumoto et al.

(10) Patent No.: US 8,751,653 B2
(45) Date of Patent: Jun. 10, 2014

(54) SYSTEM FOR MANAGING COMPUTERS AND PIECES OF SOFTWARE ALLOCATED TO AND EXECUTED BY THE COMPUTERS

(75) Inventors: Yasuhide Matsumoto, Kawasaki (JP);
Masatomo Yasaki, Kawasaki (JP);
Masashi Uyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1527 days.

(21) Appl. No.: 11/390,190

(22) Filed: Mar. 28, 2006

(65) Prior Publication Data
US 2007/0180117 A1    Aug. 2, 2007

(30) Foreign Application Priority Data

Dec. 28, 2005    (JP) ................. 2005-379362

(51) Int. Cl.
*G06F 11/00*    (2006.01)
(52) U.S. Cl.
USPC ............ 709/226; 726/229; 713/300; 713/310
(58) Field of Classification Search
USPC ........................... 709/226, 229; 713/300, 210
See application file for complete search history.

(56) References Cited

U.S. PATENT DOCUMENTS

| | | | | |
|---|---|---|---|---|
| 6,795,928 B2 * | 9/2004 | Bradley et al. | ................. | 713/320 |
| 6,889,908 B2 * | 5/2005 | Crippen et al. | ............... | 236/49.3 |
| 7,032,119 B2 * | 4/2006 | Fung | ............................ | 713/320 |
| 7,058,826 B2 * | 6/2006 | Fung | ............................ | 713/300 |
| 7,173,821 B2 * | 2/2007 | Coglitore | ..................... | 361/695 |
| 7,197,433 B2 * | 3/2007 | Patel et al. | .................... | 702/188 |
| 7,447,920 B2 * | 11/2008 | Sharma et al. | ................ | 713/300 |

(Continued)

FOREIGN PATENT DOCUMENTS

| | | |
|---|---|---|
| JP | 2003-248668 | 9/2003 |
| JP | 2004-126968 A | 4/2004 |

(Continued)

OTHER PUBLICATIONS

Ferreira, A., Mosse', D., Oh, J., "Thermal-aware Load-distribution for Real-time Server Farms", Technical report TR-06-143; Computer Science Dept, University of Pittsburgh, 2006. [retrieved from the Internet—"http://www.cs.pitt.edu/~apf75/pdf/TR-06-143.pdf" on Mar. 27, 2009].*

(Continued)

*Primary Examiner* — Saleh Najjar
*Assistant Examiner* — Joseph Pan
(74) *Attorney, Agent, or Firm* — Fujitsu Patent Center

(57) ABSTRACT

A management system for managing a plurality of computers and a plurality of pieces of software in a computer center includes: a selection data storage part for storing data regarding allocation destination selection, the data including at least either one of operation data and temperature data, wherein the operation data represent states of execution of the pieces of software by the computers, respectively, and temperature data represent temperature distribution in the computers; an instruction generation part for extracting an overheated computer that is assumed to emit more heat as compared with the other computers, and a less-heated computer that is assumed to emit less heat as compared with the other computers, by using the data regarding allocation destination selection, and generating an instruction for relocating at least a part of a piece of software allocated to the overheated computer to the less-heated computer; and an instruction part for outputting the instruction. This makes it possible to save energy for cooling the computers.

11 Claims, 15 Drawing Sheets

(56) References Cited

U.S. PATENT DOCUMENTS

| | | | |
|---|---|---|---|
| 2003/0163734 A1 | 8/2003 | Yoshimura et al. | |
| 2003/0193777 A1* | 10/2003 | Friedrich et al. | 361/687 |
| 2005/0023363 A1* | 2/2005 | Sharma et al. | 236/49.3 |
| 2005/0075837 A1 | 4/2005 | Espinoza-Ibarra et al. | |
| 2005/0188191 A1 | 8/2005 | Yoshida et al. | |
| 2005/0246514 A1 | 11/2005 | Nishida | |
| 2006/0259622 A1* | 11/2006 | Moore et al. | 709/226 |
| 2006/0259793 A1* | 11/2006 | Moore et al. | 713/300 |
| 2007/0250835 A1 | 10/2007 | Kobayashi et al. | |

FOREIGN PATENT DOCUMENTS

| | | |
|---|---|---|
| JP | 2005-234931 | 9/2005 |
| JP | 2005-316764 | 11/2005 |
| WO | WO-2005/111798 | 11/2005 |

OTHER PUBLICATIONS

Sharma, R.K. Bash, C.E.Patel, C.D.Friedrich, R.J. Chase, J.S., "Balance of Power: dynamic thermal management for Internet data centers"; Internet Syst. & Storage Lab., Hewlett-Packard Lab., USA; Internet Computing, IEEE Publication Date: Jan.-Feb. 2005, vol. 9, Issue: 1, pp. 42-49. [retrieved from IEEE database on Mar. 27, 2009].*

A. Merkel, A. Weissel, and F. Bellosa. Event-Driven Thermal Management in SMP Systems. In Proc. of the Second Workshop on Temperature-Aware Computer Systems, Jun. 2005. [retrieved from Internet—"http://www.cs.virginia.edu/~skadron/tacs05/merkel.pdf" on Mar. 27, 2009].*

Koichi, Murano "Thoroughly Utilizing Server Resource: World to be Realized by Virtualization Technology: VMware Version", Servers Select, vol. 1, No. 6, pp. 116-125 Para.1, L1 to Para.2, L5 and drawing Sep. 1, 2005, p. 123, partial English translation.

Masaki, Tatezono et al., "MPI Environment with Load Balancing using Virtual Machine", IEICE Technical Report vol. 105, No. 225 pp. 7-12 Ch.4,Para.1,L.38-Ch.4,Sec.4.5,Para.1,L.24 Jul. 28, 2005, p. 9-10, partial English translation.

"Japanese Office Action" mailed by JPO and corresponding to Japanese application No. 2005-379362 on Mar. 1, 2011.

Izumi, Miki et al., "Aim and ability of full-scale data center ~ Example of PSI Net (Japan) and Exodus (U.S.)", Interop Magazine, vol. 9, No. 10, Dec. 1, 1999, pp. 84-87, with partial English translation.

* cited by examiner

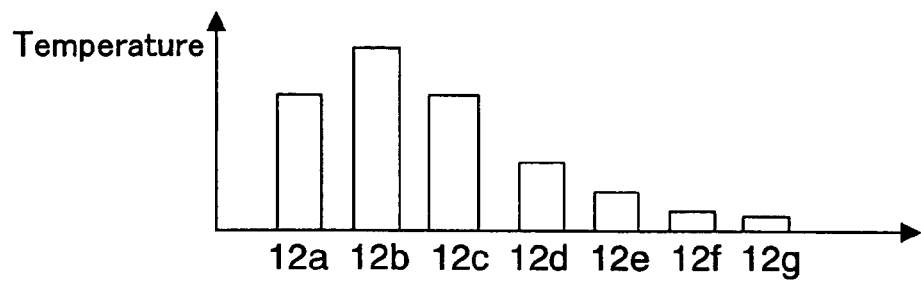
FIG.8A
FIG.8B
| | 12a 12b 12c 12d 12e 12f 12g |
|---|---|
| Activation /deactivation | ON ON ON OFF OFF OFF OFF |
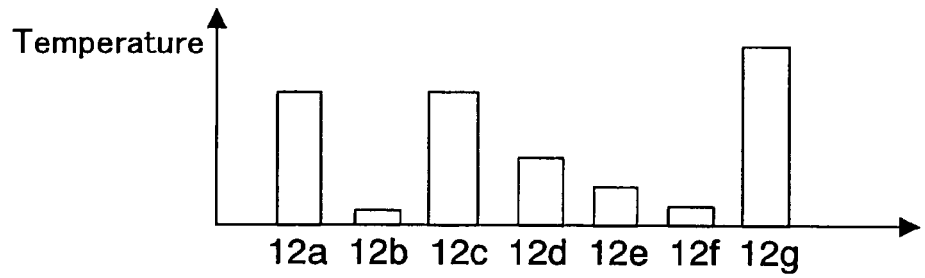
FIG.8C

SYSTEM FOR MANAGING COMPUTERS AND PIECES OF SOFTWARE ALLOCATED TO AND EXECUTED BY THE COMPUTERS

BACKGROUND OF THE INVENTION

1. Field of the Invention

The present invention relates to a management system such as an Internet data center (hereinafter referred to as IDC) or the like, a management program, and a management method, for managing a plurality of computers and a plurality of pieces of software allocated to the computers.

2. Description of Related Art

In recent years, environmental problems such as global warming have been increasingly serious, and companies and public offices are obliged to urgently institute environmental protection measures such as reduction of power consumption. Particularly, in a computer center such as IDC in which a plurality of computers composed of pieces of hardware are provided, when a plurality of computers are operating, electric power consumed for cooling down the plurality of computers accounts for a considerable part of the entire electric power consumed, and its ratio sometimes reaches approximately 40%. Therefore, reduction of the power consumption for the cooling is demanded.

In IDC, pieces of software for executing predetermined operations are allocated to a plurality of computers. In a utility computing data center, to which computer which software is allocated is controlled dynamically according to needs. For example, if software for performing high-volume processing is allocated to a certain computer, the operation amount of the computer increases. With this increase in the operation amount, the amount of heat radiated from the computer also increases. As a result, failures due to heat emission by the computer could possibly occur.

To prevent such failures due to such heat emission, it is necessary to keep low the temperature of the space where the computer is disposed, by using an air conditioner, for instance. However, to keep the temperature of the space low, a large amount of electric power is needed for operating the air conditioner. This consequently makes it difficult to reduce the power consumption.

Conventionally, as a measure to cope with heat radiated by a computer, an information processing device that executes an operation such as stopping the program executed by using the computer when a rise of temperature of the computer is detected has been proposed by, for example, JP 2005-316764A. This makes it possible to control heat emission of a computer and save energy for the cooling.

SUMMARY OF THE INVENTION

However, the foregoing conventional information processing device has to decrease an operation amount of a computer, so as to reduce the heat emission of the computer. A decrease in the operation amount of the computer causes the computer to fail a job that the computer is supposed to execute. Therefore, the reduction of power consumption without a decrease in serviceability of a computer has been a challenge to address.

To solve the above-described problems, it is an object of the present invention to provide a management system, a management method, and a management program, each of which makes it possible to save energy for cooling a plurality of computers while maintaining the operation amount in total of the plurality of computers.

A management system according to the present invention is a management system for, in a computer center in which a plurality of computers including hardware are provided, managing the computers and pieces of software allocated to and executed by the computers, respectively. The management system includes: a selection data storage part for storing data regarding allocation destination selection, the data including at least either one of operation data and temperature data, wherein the operation data including sets of operation data, each set representing a state of execution of one piece of software by the computer to which the piece of software is allocated, and the temperature data represent temperature distribution in the computers; an instruction generation part for extracting, from the computers, an overheated computer that is assumed to emit more heat as compared with the other computers, and a less-heated computer that is assumed to emit less heat as compared with the other computers, by using the data regarding allocation destination selection, and generating an instruction for relocating at least a part of a piece of software allocated to and executed by the overheated computer to the less-heated computer; and an instruction part for outputting the instruction.

The instruction generation part is allowed to extract an overheated computer that emits more heat due to a high operation level as compared with the other computers, and a less-heated computer that emits less heat due to a low operation level as compared with the other computers, by using the data regarding allocation destination selection containing at least either one of the operation data and the temperature data. The instruction generation part generates an instruction for relocating software allocated to the overheated computers to the less-heated computer. And the instruction part outputs the instruction. This causes the software that operates with use of the overheated computer assumed to emit more heat as compared with the other computers to be operated by the less-heated computer assumed to emit less heat as compared with the other computers. Consequently, heat emission by the overheated computer is reduced. In other words, concentration of heat emission to a part of computers can be avoided while the total operation amount of the plurality of computers is maintained. Thus, the management system optimizes the allocation of software to a plurality of computers, thereby reducing overall energy consumption for air conditioning while maintaining a total operation amount of the computers. This makes it possible to save energy for the cooling of the plurality of computers in the computer center.

A management program according to the present invention stored in a recording medium is a management program for causing a management computer to execute processing for, in a computer center in which a plurality of computers including hardware are provided, managing the computers and pieces of software allocated to and executed by the computers, respectively. The management program allows the management computer to execute: selection data reading processing for reading data regarding allocation destination selection from a storage part of the management computer, the data regarding allocation destination selection including at least either one of operation data and temperature data, wherein the operation data include sets of operation data that represent states of execution of the pieces of software by the computers, respectively, and temperature data represent temperature distribution in the computers; instruction generating processing for extracting, from the computers, an overheated computer that is assumed to emit more heat as compared with the other computers, and a less-heated computer that is assumed to emit less heat as compared with the other computers, by using the data regarding allocation destination selection, and generating an instruction for relocating at least a part of a piece of software allocated to the overheated computer to the less-heated computer; and instructing processing for outputting the instruction.

A management method according to the present invention is a management method for, in a computer center in which a plurality of computers including hardware are provided, managing the computers and pieces of software allocated to and executed by the computers, respectively, by using a management computer. The method includes: an operation executed by an instruction generation part provided in the management computer for reading data regarding allocation destination selection from a storage part of the management computer, the data regarding allocation destination selection including at least either one of operation data and temperature data, wherein the operation data include sets of operation data that represent states of execution of the pieces of software by the computers, respectively, and temperature data represent temperature distribution in the computers; an operation executed by the instruction generation part provided in the management computer for extracting, from the computers, an overheated computer that is assumed to emit more heat as compared with the other computers, and a less-heated computer that is assumed to emit less heat as compared with the other computers, by using the data regarding allocation destination selection, and generating an instruction for relocating at least a part of software allocated to the overheated computer to the less-heated computer; and an operation executed by an instruction part provided in the management computer for outputting the instruction.

According to the present invention, it is possible to provide a management system, a management method, and a management program that make it possible to save energy for the cooling of a plurality of computers while maintaining the total operation amount of the computers.

BRIEF DESCRIPTION OF THE DRAWINGS

FIG. 8A is a bar chart showing a temperature distribution of the blade servers shown in FIG. 1. FIG. 8B is a table showing activation/deactivation of business applications in the blade servers shown in FIG. 1. FIG. 8C is a bar chart showing a temperature distribution of the blade servers shown in FIG. 1.

DETAILED DESCRIPTION OF THE INVENTION

Figure 1:
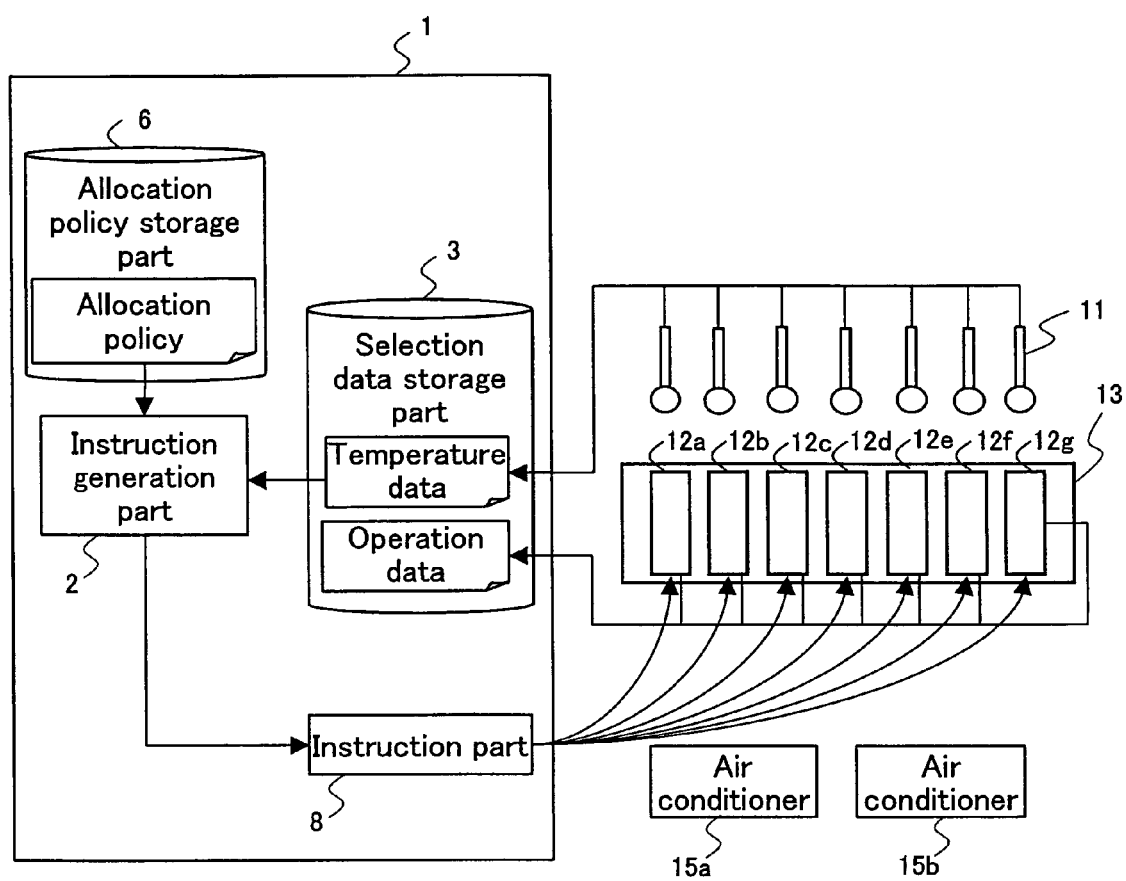
FIG. 1 is a functional block diagram showing a configuration of a management system according to Embodiment 1 of the present invention.

A "computer" herein is a physical device including hardware, and includes at least a central processing unit (CPU) and a storage unit. The plurality of computers in the computer center that are to be managed by the management system according to the present invention are not limited to computers that respectively have enclosures so as to be independent from one another. The "plurality of computers" provided in the computer center herein signify a plurality of computers as processing entities that execute software. "Software" herein refers to, in addition to computer programs to be executed by computers, data used in the execution of computer programs also.

It is preferable that the management system according to the present invention further includes a cost data storage part for storing cost data, the cost data including air conditioning cost data used in calculation of an air conditioning cost for controlling temperatures in the computers or in the vicinities thereof, and operation cost data used in calculation of an operation cost for operating the computers, and the instruction generation part extracts the overheated computer and the less-heated computer by using the data regarding allocation destination selection, and calculating an air conditioning cost as well as an operation cost in the case where at least a part of the software allocated to the overheated computer is relocated to the less-heated computer, by using the cost data, and generates the instruction in the case where it determines from the air conditioning cost and the operation cost that an electric power cost can be reduced by relocating at least a part of the piece of software allocated to the overheated computer to the less-heated computer. With this, the instruction generation part generates an instruction that causes the overall cost to be reduced.

In the management system according to the present invention, each set of the operation data preferably includes load data representing a load applied to the computer when the computer executes the piece of software allocated thereto.

A load applied to a computer is closely related to a degree of heat emission by the computer. Therefore, by causing the load data to be included in the operation data, the instruction generation part is allowed to extract the overheated computer and the less-heated computer based on respective loads applied to the computers. For instance, the instruction generation part is allowed to extract a computer having a load greater than a predetermined value, or a computer having a greater load as compared with the other computers, as an overheated computer.

In the management system according to the present invention, each set of the operation data preferably includes operating entity data about an operating entity that performs business operations by utilizing the computer and the piece of software allocated thereto.

With the operation data including the operating entity data, the instruction generation part is allowed to generate an instruction by taking the circumstances of the operating entity utilizing the computer and the software into consideration.

In the management system according to the present invention, each set of the operation data preferably includes activation data representing a state of activation of the piece of software activated by the computer to which the piece of software is allocated.

With the operation data including the activation data, the instruction generation part is allowed to presume a degree of heat emission by each computer based on the states of activation of the pieces of software executed by the computers, respectively. By so doing, the overheated computer and the less-heated computer can be extracted.

In the management system according to the present invention, each set of the operation data preferably includes structure data representing at least either one of a structure of the hardware of the computer and a structure of the piece of software allocated thereto.

With the operation data including the structure data, the instruction generation part is allowed to extract the overheated computer and/or the less-heated computer based on at least one of a structure of each computer and a structure of software allocated to each computer. By so doing, the instruction generation part is allowed to extract a set of an overheated computer and a less-heated computer between which software is easy to relocate, by taking the structures of the computers and the software into consideration. As a result, the instruction generation part is allowed to generate an instruction for efficiently relocating a piece of software allocated to the overheated computer to the less-heated computer.

The management system according to the present invention preferably further includes an allocation policy storage part for storing an allocation policy in an updatable state, the allocation policy including data representing a condition of a state of execution of software by a computer under which the computer is determined to be an overheated computer, and a condition of a state of execution of software by a computer under which the computer is determined to be a less-heated computer, and the instruction generation part extracts the overheated computer and the less-heated computer based on the conditions indicated by the allocation policy and the states of execution of the software by the computers indicated by the operation data, and generates the instruction.

The instruction generation part extracts the overheated computer and the less-heated computer by using the allocation policy stored in the allocation policy storage part. Therefore, the instruction generation part is allowed to autonomously determine whether or not a certain computer is an overheated computer and whether or not it is a less-heated computer, by referring to the allocation policy, with the states of execution of the software by the computers. In other words, the instruction generation part is allowed to make autonomous determination without data for the foregoing determination being inputted from outside. Further, since the allocation policy is stored in an updatable state, the criteria for determination by the instruction generation part about whether or not a computer is an overheated computer and whether or not it is a less-heated computer can be updated according to circumstances.

In the management system according to the present invention, preferably, the allocation policy further include data representing a condition of temperature under which a computer is determined to be an overheated computer, and a condition of temperature under which a computer is determined to be a less-heated computer, and the instruction generation part extracts the overheated computer and the less-heated computer based on the conditions indicated by the allocation policy and temperature distribution indicated by the temperature data, and generates the instruction.

The instruction generation part is allowed to autonomously determine whether or not a certain computer is an overheated computer and whether or not it is a less-heated computer, by referring to the allocation policy, with use of the temperature data. In other words, the instruction generation part is allowed to make autonomous determination without data for the foregoing determination being inputted from outside.

Hereinafter, a management system according to an embodiment of the present invention is described with reference to the drawings. FIG. 1 is a functional block diagram illustrating a configuration of an IDC incorporating a management system 1 according to an embodiment of the present invention.

Embodiment 1

An IDC shown in FIG. 1 includes a management system 1, a rack 13 containing blade servers 12a to 12g, temperature sensors 11, and air conditioners 15a and 15b.

The management system 1 includes a selection data storage part 3 for storing data regarding allocation destination selection, an allocation policy storage part 6, an instruction generation part 2, and an instruction part 8. The management system 1 is connected with a plurality of the blade servers 12a to 12g contained in the rack 13. In the vicinities of the rack 13, air conditioners 15a and 15b are disposed that control the temperature of space Where the rack 13 is disposed. The air conditioner 15a shown in FIG. 1 has a function for controlling the temperature in the vicinity of the blade servers 12a to 12c, while the air conditioner 15b has a function of controlling the temperature in the vicinity of the blade servers 12d to 12g.

It should be noted that in the example shown in FIG. 1, the management system 1 is configured to be connected with the blade servers contained in the rack 13, but the number of the rack 13 is not limited to one. The configuration may be such that the management system 1 is connected with blade servers contained in a plurality of racks. The management system 1 is not necessarily connected directly with the plurality of blade servers 12a to 12g as shown in FIG. 1. The management system 1 may be connected indirectly with the blade servers 12a to 12g via a controlling device or the like that controls the blade servers 12a to 12g.

Each of the blade servers 12a to 12g is an independent computer. Pieces of software for performing processing with use of the blade servers 12a to 12g are allocated to the blade servers 12a to 12g, respectively. The blade servers 12a to 12g operate according to the pieces of software allocated to the same, respectively.

The software allocated to the blade servers 12a to 12g is a set of programs and date stored in storage units of the blade servers 12a to 12g. CPUs of the blade servers 12a to 12g execute the programs, respectively, whereby predetermined processing is performed. The software includes operating systems, device drivers, middleware, applications of various types, databases, files, etc. of the blade servers. Hardware resources such as a CPU, a storage unit, a network interface, an input/output interface, etc. provided in each blade server operate according to the software allocated to the blade server.

The blade servers 12a to 12g shown in FIG. 1 are a part of the computers composing the IDC. Therefore, pieces of software for executing operations for businesses of a plurality of clients (for instance, companies) are allocated to the blade servers 12*a* to 12*g*. For example, software for executing operations for the personnel management of Company A is allocated to the blade server 12*a*, software for executing operations for WEB-order business administered by Company B is allocated to the blade server 12*b*, and software for executing operations for electronic commercial transactions of Company C is allocated to the blade servers 12*c* to 12*g*. The IDC capable of dynamically updating the allocation of software is called utility computing data center. The IDC of the present embodiment is of one type of such a utility computing data center.

The management system 1 is connected with the plurality of temperature sensors 11. The temperature sensors 11 are temperature sensors for determining the temperatures in the vicinities of the blade servers 12*a* to 12*g*. The temperature sensors 11 preferably are disposed at positions corresponding to the blade servers 12*a* to 12*g*. With these, the temperatures in the vicinities of the blade servers 12*a* to 12*g* can be determined. It should be noted that the temperature sensors 11 may be provided inside the blade servers 12*a* to 12*g*. This allows the temperature sensors 11 to determine respective temperatures inside the blade servers 12*a* to 12*g*.

The selection data storage part 3 of the management system 1 stores temperature data and operation data. The temperature data are data that represent temperature distribution in the vicinities of the blade servers 12*a* to 12*g*, determined by the temperature sensors 11. It should be noted that in the present embodiment, the temperature data are data obtained by temperature survey by the temperature sensors 11, but instead the temperature data may be, for instance, data derived by calculation based on data that represent operating statuses of the blade servers 12*a* to 12*g* or the like. In the latter case, the temperature sensors 11 are unnecessary.

The operation data are data that represent states of execution of software in the blade servers 12*a* to 12*g*. The states of execution of software indicated by sets of the operation data may be, for instance, an operation status of hardware such as a CPU use ratio, a used capacity of a hard disk, a used memory capacity, and the like, as well as a state of processing by software such as types and number of applications activated, types and number of databases operating, a number of processes executed, an amount of relocated data, a number of transactions, and the like.

The allocation policy storage part 6 stores an allocation policy. The allocation policy is used, together with the data stored in the selection data storage part 3, for generating an instruction for controlling the selection of destinations to which pieces of software for causing the blade servers 12*a* to 12*g* to operate are allocated.

The instruction generation part 2 generates instructions to be supplied to the blade servers 12*a* to 12*g*, based on the temperature data and operation data stored in the selection data storage part 3 and the allocation policy stored in the allocation policy storage part 6. The instructions generated by the instruction generation part 2 include instructions for causing the blade servers to execute a specific operation.

The instruction part 8 outputs an instruction generated by the instruction generation part 2 to a blade server to which the instruction is concerned. It should be noted that the instruction part 8 does not necessarily output an instruction directly to a blade server to which the instruction is concerned. For instance, the instruction part 8 may output an instruction to a control device that controls the blade servers 12*a* to 12*g*.

The foregoing configuration allows the management system 1 to control to which blade server which software is allocated. In other words, the management system 1 is allowed to control the allocation of pieces of software to the blade servers 12*a* to 12*g*.

The management system 1 is built up in, for instance, a computer such a server, a personal computer, etc. The functions of the instruction generation part 2 and the instruction part 8 are implemented by execution of a predetermined program by a CPU provided in the computer. To form the selection data storage part 3 and the allocation policy storage part 6, a transportable storage medium such as a flexible disk or a memory card, a storage medium inside a storage device on a network, etc. can be used, apart from a storage medium built in a computer such as a hard disk, a RAM, etc. Besides, the selection data storage part 3 and the allocation policy storage part 6 may be formed with one storage medium or alternatively with a plurality of storage media.

Here, a flow of operations of the management system according to the present embodiment is described with reference to a flowchart shown in FIG. 2.

Figure 2:
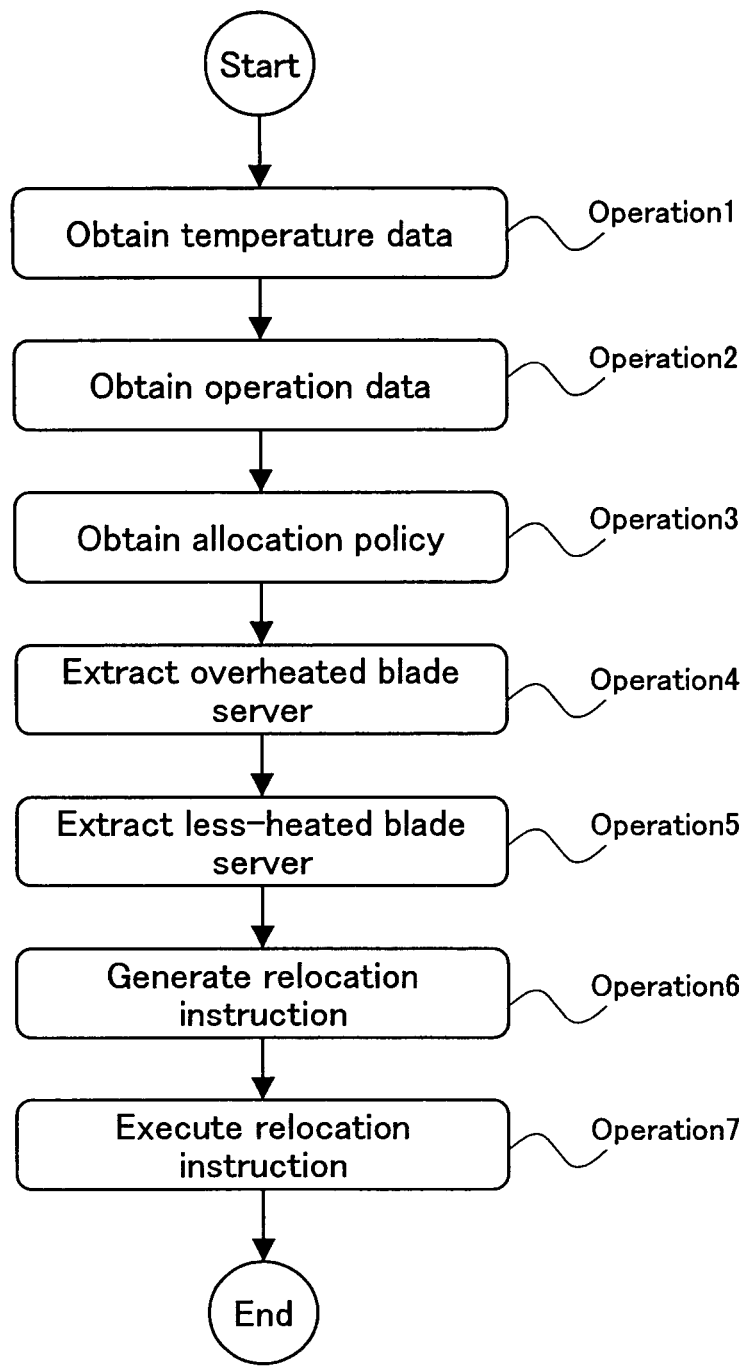
FIG. 2 is a flowchart of an operation of the management system according to Embodiment 1.

As shown in FIG. 2, first, the instruction generation part 2 fetches temperature data from the selection data storage part 3 (Operation 1). The temperature data are, for instance, data that represent temperatures as to the blade servers 12*a* to 12*g* at a certain point in time. Next, the instruction generation part 2 fetches operation data from the selection data storage part 3 (Operation 2). The instruction generation part 2 fetches operation data regarding each of the blade servers 12*a* to 12*g*.

Figure 3:
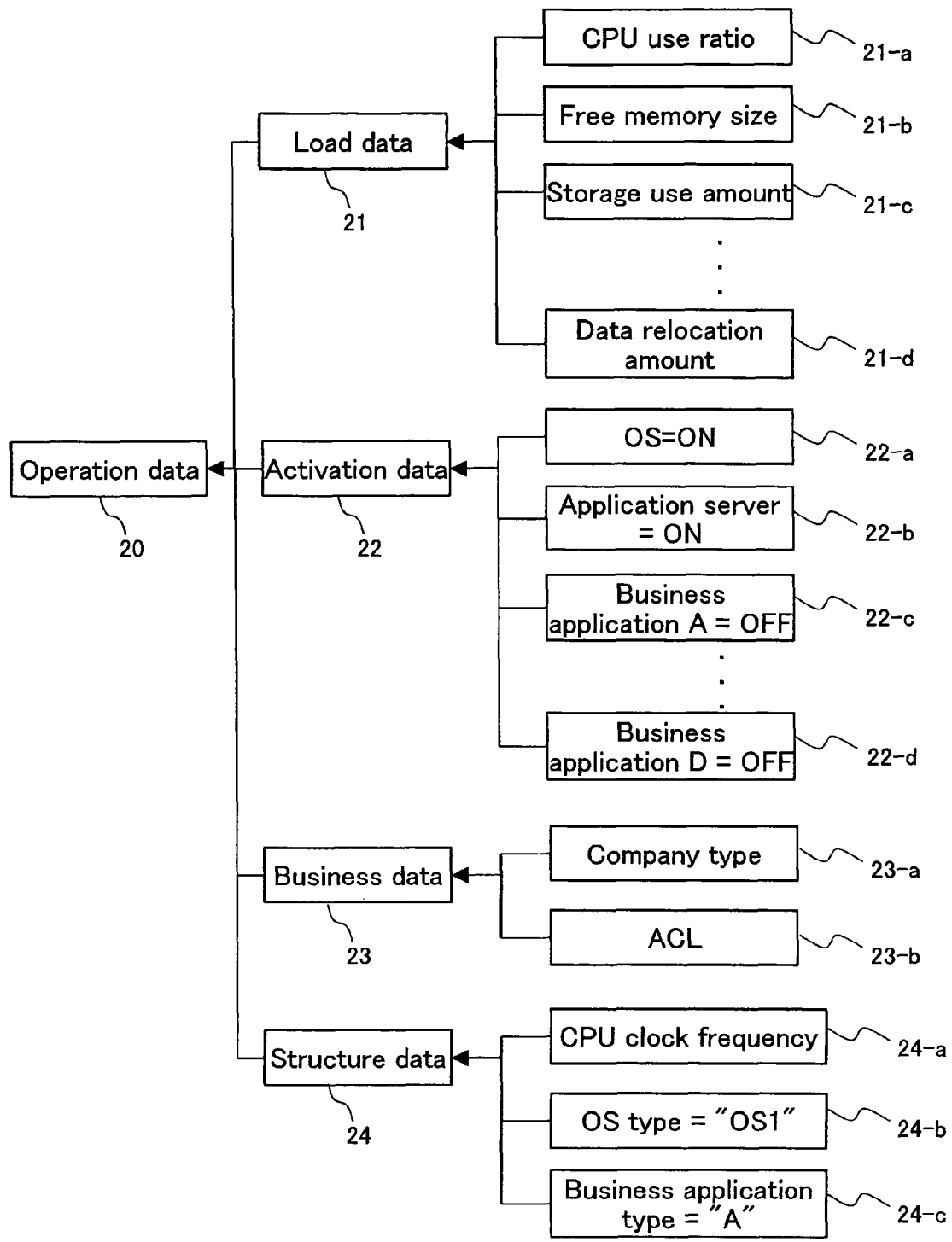
FIG. 3 shows an exemplary structure of operation data according to Embodiment 1.

FIG. 3 shows a structure of operation data regarding a certain blade server. It should be noted that the structure and contents of operation data shown in FIG. 3 are a mere example, and the structure and contents of the operation data are not limited to those of the example shown in FIG. 3. In the example shown in FIG. 3, the operation data include load data 21, activation data 22, business data 23, and structure data 24.

The load data 21 are data representing a load applied to the blade server when software allocated to the blade server runs. The load data 21 include, for instance, a CPU use ratio 21-*a*, a free memory size 21-*b* and a storage use amount 21-*c* during operations of the software, and a data relocation amount 21-*d* upon operations of the software. Thus, the load data 21 are represented by states of use of the CPU, storage units, etc. that the blade server includes, and amounts of data treated by the software.

The activation data 22 are data representing a state of activation of the software that the blade server executes so as to perform processing. The activation data 22 include, for instance, data 22-*a* regarding the activation/deactivation of the operating system (OS), data 22-*b* regarding the activation/deactivation of the application server, and data 22-*c* to 22*d* regarding activation/deactivation of business applications A to D. The application server includes middleware such as a WEB server, an authentication server, etc., which in response to a request from a client performs basic on-line processing. Examples of the basic on-line processing include connection with a data base, management of a transaction, etc. Further, the business application is application software for controlling the flow of business operations, and examples of the same include pieces of software for performing business operations such as personnel management of a company, accounting processing, on-line service reservation processing, order acceptance/placement processing in on-line shopping, and electronic transaction system processing.

The business data 23 are data about an operating entity that performs business operations by utilizing the blade server and the software. For instance, in the case where the operating entity is a company, information relating to the company is included in the business data. For instance, a company classification 23-*a*, an access control list (ACL) 23-*b*, etc. are included in the business data 23. Thus, the business data 23 are information that indicates restrictions or arrangements in business regarding the management of business operations that involve use of the blade server and the software. Further, though business data are referred to as an example of the data relating to the operating entity, the data relating to the operating entity are not limited to items relating to business thereof.

The structure data 24 are data that represent a structure of a blade server, and a structure of software allocated to the blade server. The structure data 24 include, for instance, a crock frequency 24-*a* of the CPU provided in the blade server, a type 24-*b* of the OS included in the software allocated to the blade server, a business application type 24-*c*, etc. In addition to the foregoing examples, the structure data 24 may include, for instance, data representing a distance therefrom to a neighboring blade server, data representing a position where the blade server is disposed, information relating to a manufacturer or the device or the software, and information relating to the specification of the blade server.

When obtaining operation data as described above from the selection data storage part 3 (Operation 2), the instruction generation part 2 obtains an allocation policy from the allocation policy storage part 6 as shown in FIG. 2 (Operation 3). The allocation policy is data representing conditions such as a temperature and operating statuses with which a certain blade server is determined to be an overheated blade server that is assumed to emit more heat as compared with the other blade servers, as well as conditions such as a temperature and operating statuses with which a certain blade server is determined to be a less-heated blade server that is assumed to emit less heat as compared with the other blade servers.

Figure 4:
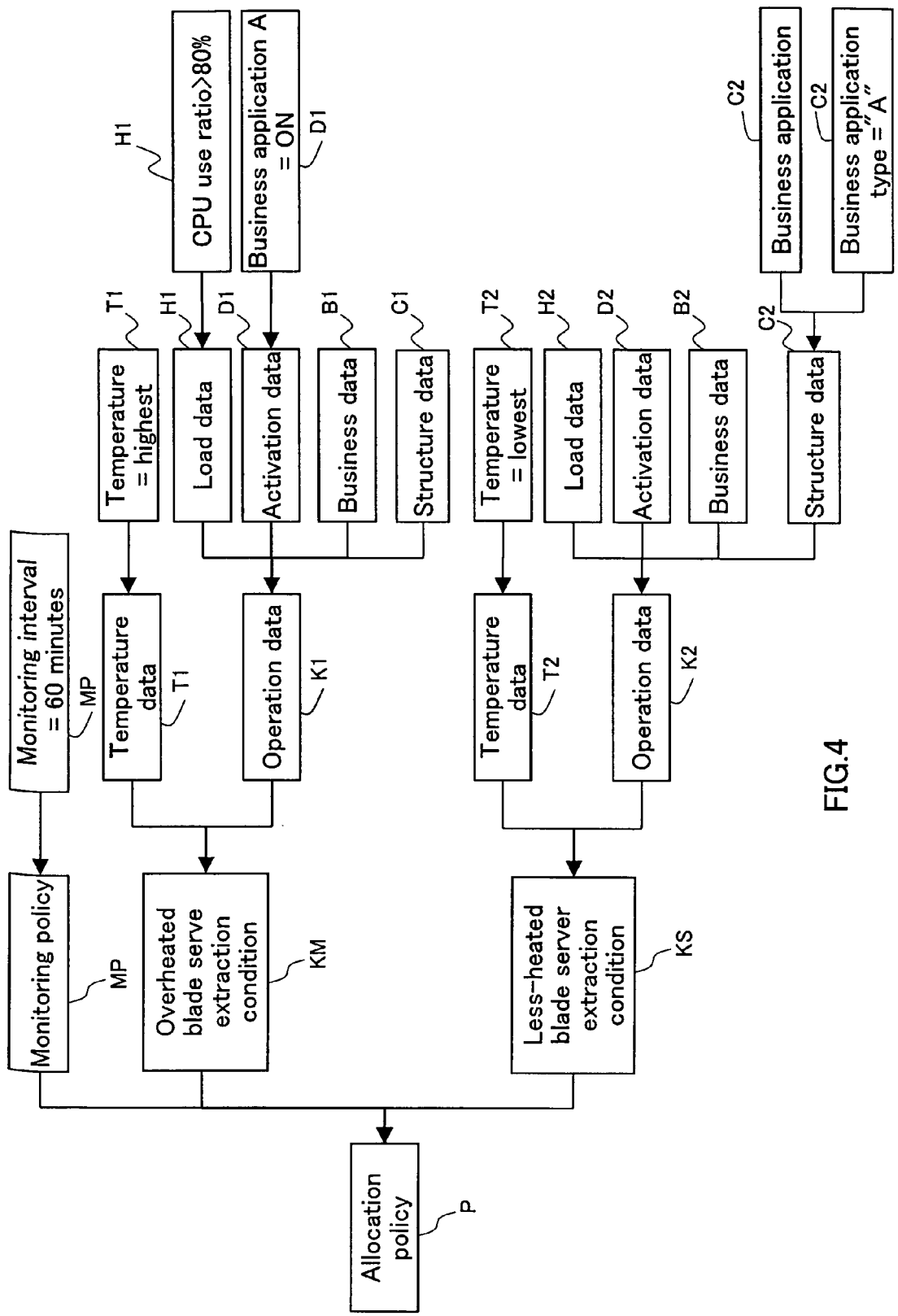
FIG. 4 shows an exemplary data structure of an allocation policy according to Embodiment 1.

FIG. 4 shows an exemplary data structure of the allocation policy. As shown in FIG. 4, the allocation policy P includes a monitoring policy MP, an overheated blade server extraction condition KM, and a less-heated blade server extraction condition KS.

The monitoring policy MP is data representing conditions of an operation for monitoring the states of the blade servers 12*a* to 12*g*. For instance, the monitoring policy MP is a monitoring timing interval representing timings at which the monitoring operation is carried out. In the example shown in FIG. 4, data indicating that the monitoring timing interval is 60 minutes are included in the monitoring policy MP. In the case where the monitoring timing interval is 60 minutes as in the foregoing example, the management system 1 performs the process shown in FIG. 2 once every 60 minutes.

The overheated blade server extraction condition KM includes temperature data T1 and operation data K1. In the example shown in FIG. 4, the temperature data T1 of the overheated blade server extraction condition KM include data indicating a condition that the highest temperature is exhibited (temperature=highest) among candidates for the overheated blade server (hereinafter referred to as overheated blade server candidates) extracted through a process that will be described later. The operation data K1 of the overheated blade server extraction condition KM include load data H1, activation data D1, business data B1, and structure data C1. In the example shown in FIG. 4, the load data H1 of the overheated blade server extraction condition KM include data indicating a condition that the CPU use ratio is greater than 80% (CPU use ratio>80%). The activation data D1 of the overheated blade server extraction condition KM include data indicating a condition that a business application A is activated (business application A=ON). The business data B1 and the structure data C1 of the overheated blade server extraction condition KM do not include data indicating a condition. This means that any condition is not specified particularly regarding the business data B1 and the structure data C1.

The less-heated blade server extraction condition KS also includes temperature data T2 and operation data K2. In the example shown in FIG. 4, the temperature data T2 of the less-heated blade server extraction condition KS include data indicating a condition that the lowest temperature is exhibited (temperature=lowest) among candidates for the less-heated blade server (hereinafter referred to as less-heated blade server candidates) extracted through a process that will be described later. The operation data K2 of the less-heated blade server extraction condition KS include load data H2, activation data D2, business data B2, and structure data C2. In the example shown in FIG. 4, the activation data D2 of the less-heated blade server extraction condition KS include data indicating a condition that the business application A is not activated (business application A=OFF). The business data B2 of the less-heated blade server extraction condition KS include information indicating that blade servers to which pieces of software for executing business operations for Company A are allocated are not extracted as a less-heated blade server (company type=other than Company A). The structure data C2 of the less-heated blade server extraction condition KS include data indicating a condition that the free memory size is more than 512 MB (free memory size>512 MB) and a condition that the "application A" is installed as a business application (business application type="A"). The load data H2 of the less-heated blade server extraction condition KS do not include data indicating a condition. This means that any condition is not specified particularly regarding the load data H2.

Figure 5:
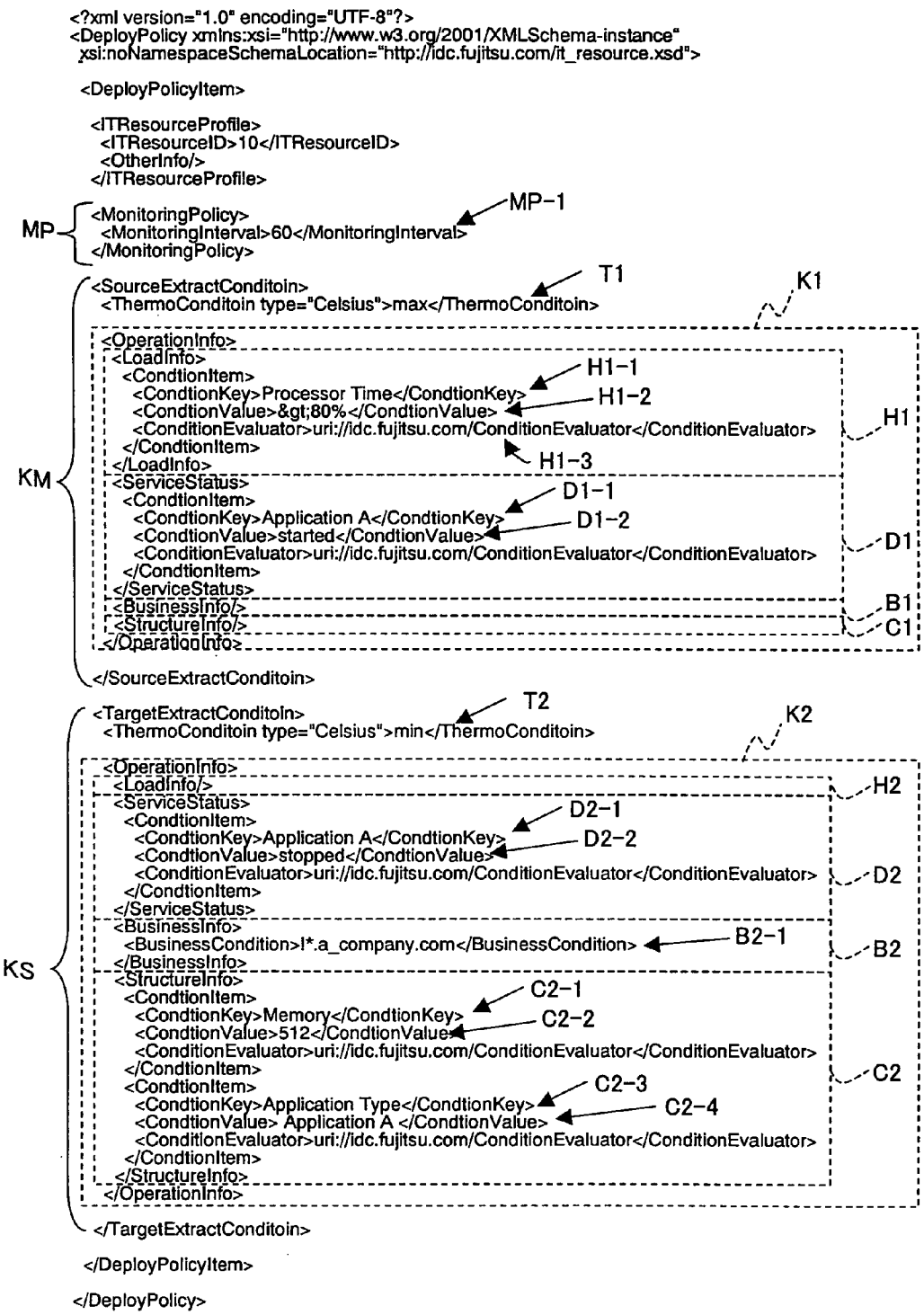
FIG. 5 is an exemplary specific data of the allocation policy according to Embodiment 1.

FIG. 5 shows exemplary data representing the allocation policy P shown in FIG. 4. The allocation policy shown in FIG. 5 is described in the extensible markup language (XML) format. It should be noted that in the data shown in FIG. 5, portions corresponding to the data shown in FIG. 4 are designated by the same reference numerals.

In FIG. 5, a monitoring policy is described in a portion represented by MP, overheated blade server extraction conditions are described in a portion represented by KM, and less-heated blade server extraction conditions are described in a portion represented by MS In a portion represented by MP-1, it is described that the monitoring timing interval is a "MonitoringInterval" element of 60 (minutes).

In the overheated blade server extraction condition KM, a portion represented by T1 is a "ThermoCondition" element, which represents temperature data. The element content is "maximum" ("max"), which represents, for instance, that the condition for extraction is that the highest temperature is exhibited among the overheated blade server candidates.

In the overheated blade server extraction condition KM, a portion represented by K1 is an "OperationInfo" element, which represents operation data. The operation data K1 include load data H1 represented by a "LoadInfo" element, activation data D1 represented by a "ServiceInfo" element, business data B1 represented by a "BusinessInfo" element, and a structure data C1 represented by a "StructureInfo" element.

In the load data H1, a "ConditionKey" element H1-1 included in the "ConditionItem" element designates the CPU use ratio ("Processor Time"), and a "ConditionValue" element H1-2 indicates that the value of the CPU use ratio is greater than 80% (">80%"). The "ConditionEvaluator" element H1-3 indicates information indicating a path to a program to be executed to evaluate the value indicated by the "ConditionValue" element.

In the activation data D1, a "ConditionKey" element D1-1 included in the "ConditionItem" element designates the application A ("Application A"), and a "ConditionValue" element D1-2 indicates that the application A is activated ("started").

The "BusinessInfo" element indicating the business data B1 does not have element content. The "StructureInfo" element indicating the structure data C1 does not have element content, either.

In the less-heated blade server extraction condition KS, a portion represented by T2 is a "ThermoCondition" element, which indicates temperature data. The element content is "minimum" ("min"), which represents, for instance, that the condition for extraction is that the lowest temperature is exhibited among the less-heated blade server candidates.

In the less-heated blade server extraction condition KS, a portion represented by K2 is an "OperationInfo" element, which represents operation data. The operation data K2 include the load data H2 represented by a "LoadInfo" element, the activation data D2 represented by a "ServiceInfo" element, the business data B2 represented by a "BusinessInfo" element, and the structure data C2 represented by a "StructureInfo" element.

The "LoadInfo" element representing the load data H2 does not have element content. In the activation data D2, a "ConditionKey" element D2-1 included in the "ConditionItem" element designates the application A ("Application A"), and a "ConditionValue" element D2-2 indicates that the application A is not activated ("stopped").

In the business data B2, a "BusinessCondition" element B2-1 indicates a condition that a blade server that executes a business operation for Company A is not extracted ("!*.a_companycom").

In the structure data C2, a "ConditionKey" element C2-1 included in a "ConditionItem" element designates the free memory size ("Memory"), and a "ConditionValue" element C2-2 indicates that the value thereof is 512 MB ("512"). Further, a "ConditionKey" element C2-3 designates the application type ("Application Type"), and a "ConditionValue" element C2-4 indicates that the application type is the application A ("Application A").

Thus, FIGS. 4 and 5 show exemplary data structure of the allocation policy and contents thereof, but the data structure and contents of the allocation policy are not limited to exemplary ones shown in FIGS. 4 and 5.

When obtaining an allocation policy as described above from the allocation policy storage part 6 (Operation 3 of FIG. 2), the instruction generation part 2 extracts an overheated blade server from the blade servers 12a to 12g (Operation 4). The overheated blade server is a blade server that is assumed to emit heat increasingly due to concentration of operations, as compared with the other blade servers. The instruction generation part 2 extracts an overheated blade server by using the temperature data obtained in Operation 1, the operation data obtained in Operation 2, and the overheated blade server extraction condition of the allocation policy obtained in Operation 3. The process for extracting an overheated blade server is described later in more detail.

Further, the instruction generation part 2 extracts a less-heated blade server from the blade servers 12a to 12g, the less-heated blade server being a blade server that is assumed to emit less heat as compared with the other blade servers (Operation 5). The instruction generation part 2 extracts a less-heated blade server by using the temperature data obtained in Operation 1, the operation data obtained in Operation 2, and the less-heated blade server extraction condition of the allocation policy obtained in Operation 3. The process for extracting the less-heated blade server is described later in more detail.

The instruction generation part 2 generates an instruction for moving at least a part of the software that involves an operation of the overheated blade server, to a less-heated blade server (Operation 6). The instruction generation part 2 generates, for instance, an instruction for stopping a predetermined application contained in software for performing processing with use of the overheated blade server, an instruction for causing a less-heated blade server to start executing the application anew, and the like.

The instruction part 8 transmits instructions generated by the instruction generation part 2 to the overheated blade server and the less-heated blade server (Operation 7). By so doing, the software running in the overheated blade server is relocated to the less-heated blade server.

Thus, as shown in FIG. 2, the management system 1 extracts an overheated blade server and a less-heated blade server by using temperature data, operation data, and an allocation policy, and generates an instruction for relocating software running in the overheated blade server to the less-heated blade server.

Figure 6:
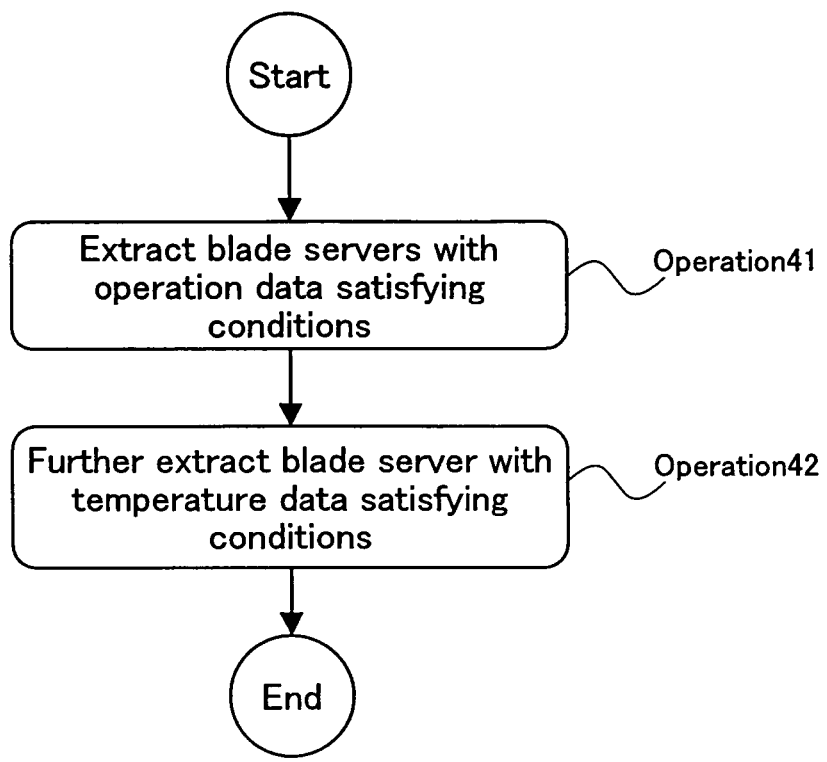
FIG. 6 is a flowchart of processing for extracting an overheated blade server according to Embodiment 1.

Next, a process for extracting an overheated blade server is described. FIG. 6 is a flowchart showing an exemplary process executed by the instruction generation part 2 for extracting an overheated blade server. Here, an exemplary case where one blade server is extracted as an overheated blade server from the blade servers 12a to 12g is described.

As shown in FIG. 6, the instruction generation part 2 determines whether or not each of respective sets of operation data regarding the blade servers 12a to 12g satisfy the conditions of the operation data indicated in the allocation policy. Through this process, the instruction generation part 2 extracts blade servers that have operation data satisfying the conditions of the operation data indicated in the allocation policy, as overheated blade server candidates (Operation 41). In other words, the instruction generation part 2 extracts overheated blade server candidates by comparing each of the sets of operation data of the blade servers 12a to 12g with the conditions of the operation data indicated in the allocation policy.

For instance, the conditions of the operation data K1 indicated in the allocation policy P shown in FIG. 4 are that the CPU use ratio indicated by the load data of a blade server is higher than 80% (CPU use ratio>80%: H1), and that the activation data of a blade server indicate the activation of the business application A (business application A=ON: D1). Each of the sets of operation data of the blade servers 12a to 12g has a structure as shown in FIG. 3, for example. The instruction generation part 2, for instance, refers to the CPU use ratio 21-a included in the load data 21 and the data 22-c regarding the activation/deactivation of the business application A included in the activation data 22 in the operation data shown in FIG. 3, and compares the same with the condition (CPU use ratio>80%) of the load data H1 and the condition (business application A=ON) of the activation data D1, which are indicated in the allocation policy. Blade servers each of which exhibits operation data that satisfy both of the foregoing conditions are extracted overheated blade server candidates.

Next, from the overheated blade server candidates extracted in Operation 41, the instruction generation part 2 extracts, as the overheated blade server, a blade server that exhibits temperature data satisfying the condition (temperature=highest) of the temperature data T1 of the allocation policy (Operation 42). In other words, the instruction generation part 2 extracts a blade server having temperature data that exhibit its temperature is highest as the overheated blade server. The instruction generation part 2 is capable of extracting a blade server exhibiting the highest temperature as the overheated blade server by, for instance, comparing the temperature data of the extracted overheated blade server candidates with one another.

Through the foregoing process, a blade server that exhibits the highest temperature, among the blade servers that exhibit the CPU use ratio of more than 80% and in which the business application A is activated, is extracted as the overheated blade server.

It should be noted that herein, since the temperature data of the allocation policy designate "temperature=highest" as the condition, the instruction generation part 2 extracts a blade server exhibiting the highest temperature from the blade server candidates. Alternatively, for instance, the operation may be such that in the case where a temperature as a threshold is designated by the temperature data of the allocation policy, the instruction generation part 2 extracts a blade server exhibiting a temperature higher than the threshold temperature as the overheated blade server.

Further, a case where only one overheated blade server is extracted is described with reference to FIG. 6, but in Operation 42, for instance, in the case where there are a plurality of blade servers exhibiting temperatures higher than the predetermined value, the instruction generation part 2 may extract all of them as the overheated blade servers.

Thus, the instruction generation part 2 is capable of extracting an overheated blade server based on temperature data and operation data. It should be noted that in the process shown in FIG. 6, an overheated blade server is extracted based on temperature data and operation data, but alternatively it is possible to extract an overheated blade server by using either temperature data or operation data.

Figure 7:
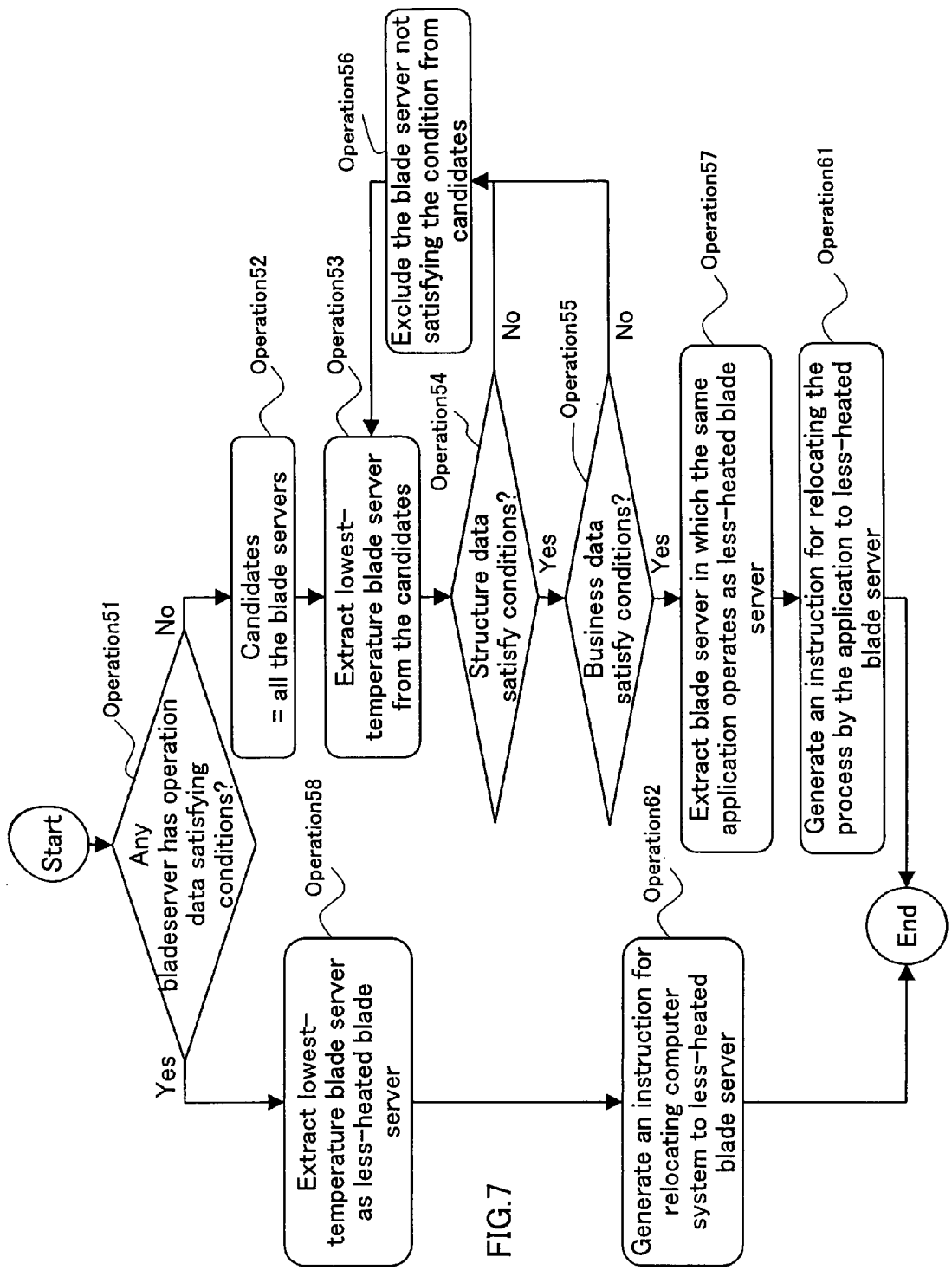
FIG. 7 is a flowchart of processing for extracting a less-heated blade server according to Embodiment 1.

Next, a process for extracting a less-heated blade server is described. FIG. 7 is a flowchart showing an exemplary process for extraction of a less-heated blade server and generation of an instruction by the instruction generation part 2. Here, an exemplary case where one blade server among the blade servers 12a to 12g is extracted as a less-heated blade server is described.

As shown in FIG. 7, first, from the blade servers 12a to 12g, the instruction generation part 2 extracts blade servers exhibiting operation data that satisfy the conditions of the operation data indicated in the allocation policy. The instruction generation part 2 determines whether or not each of respective sets of operation data regarding the blade servers 12a to 12g satisfy the condition of the activation data indicated in the allocation policy.

In the exemplary allocation policy shown in FIG. 4, the condition of the activation data D2 of the less-heated blade server extraction condition KS is "business application A=OFF". In this case, the instruction generation part 2 refers to activation data 22 included in each of the sets of operation data 20 of the blade servers 12a to 12g, and is capable of determining whether or not the business application A is activated or deactivated in each of the blade servers 12a to 12g. Through this process, the instruction generation part 2 is allowed to, for instance, regard blade servers in which the business application A is deactivated as being less-activated, and extract the same as less-heated blade server candidates.

In the case where there is no blade server in which the business application A is deactivated (Operation 51: No), the instruction generation part 2 regards all the blade servers 12a to 12g as less-blade server candidates (Operation 52), and refers to temperature data of the less-heated blade server candidates so as to extract a blade server that exhibits the lowest temperature (Operation 53).

The instruction generation part 2 compares structure data 24 of the extracted blade server with the conditions of the structure data C2 included in the less-heated blade server extraction condition KS indicated in the allocation policy, and determines whether or not the extracted blade server satisfies the conditions of the structure data (Operation 54). For instance, in the exemplary allocation policy shown in FIG. 4, the conditions of the structure data C2 of the less-heated blade server extraction condition KS are that the blade server has a free memory size of 512 MB or more (free memory size>512 MB) and that the business application A is installed in the blade server (business application type="A"). The instruction generation part 2 refers to the structure data of the blade server extracted in Operation 53, and compares the same with the foregoing two conditions of the structure data C2 of the allocation policy P (free memory size>512 MB, and business application type="A"). Through this process, the instruction generation part 2 determines whether or not the structure data 24 of the extracted blade server satisfies the conditions of the structure data C2 indicated in the allocation policy.

It should be noted that the conditions of the structure data are not limited to the above-described examples. For instance, a distance between the overheated blade server and the less-heated blade server may be set as a condition. For instance, the condition of the structure data may be set so that the blade server neighboring to the overheated blade server should not be extracted as the less-heated blade server candidate.

In the case where the blade server extracted in Operation 53 satisfies the conditions of the structure data C2 indicated in the allocation policy (Operation 54: Yes), the instruction generation part 2 determines whether or not the business data 23 included in the operation data 20 of the foregoing blade server satisfy the conditions of the allocation policy P (Operation 55). In the case where the blade server extracted in Operation 53 does not satisfy the conditions of the business data B2 indicated in the allocation policy P (Operation 54: No), the instruction generation part 2 excludes the foregoing blade server not satisfying the condition form the candidates (Operation 56), and from the remaining candidates after the exclusion of the foregoing blade server, a blade server that exhibits the lowest temperature is extracted again (Operation 53).

Through the foregoing process, the blade servers whose structure data 24 do not satisfy the conditions of the allocation policy P are excluded from the less-blade server candidates. Thus, the blade servers that have hardware structures or software structures satisfying the conditions indicated in the structure data C2 of the allocation policy are extracted as the less-heated blade server candidates. In the present embodiment, the blade servers in which the business application A is activated are regarded as the less-heated blade server candidates.

It should be noted that in the operation for making determination regarding the conditions of the structure data (Operation 54), when structure data 24 of a blade server satisfy all the conditions of the structure data C2 indicated in the allocation policy P, the instruction generation part 2 determines that the foregoing blade server satisfies the conditions of the structure data C2 indicated in the allocation policy P (Operation 54: Yes), but the operation may be such that when structure data 24 of a blade server satisfy a part of the conditions of the structure data C2 indicated in the allocation policy P, the instruction generation part 2 determines that the foregoing blade server satisfies the conditions of the structure data C2 indicated in the allocation policy P (Operation 54: Yes).

In Operation 55, the instruction generation part 2 compares business data 23 of the extracted blade server with the conditions of the business data B2 included in the less-heated blade server extraction condition KS indicated in the allocation policy P, and determines whether or not the blade server satisfies the conditions of the business data B2 indicated in the allocation policy P. For instance, in the exemplary allocation policy shown in FIG. 4, the condition of the business data B2 included in the less-heated blade server extraction condition KS is that the company that executes a business operation by using the blade server is not Company A (company type=other than Company A). The instruction generation part 2 refers to the business data 23 of the blade server extracted in Operation 53 and compares the same with the foregoing condition (company type=other than Company A). Through the foregoing process, the instruction generation part 2 is capable of determining whether or not the business data 23 of the blade server extracted in Operation 53 satisfies the condition of the business data B2 indicated in the allocation policy P.

In the case where the blade server extracted in Operation 53 does not satisfy the condition of the business data B2 (Operation 55: No), the instruction generation part 2 excludes the foregoing blade server from the candidates (Operation 56), and again extracts a blade server that exhibits the lowest temperature from the remaining candidates (Operation 53). Thus, the blade servers that do not satisfy restrictions and arrangements in business are excluded from the less-heated blade server candidates.

In the case where the blade server extracted in Operation 53 satisfies the conditions of the business data B2 (Operation 55: Yes), the instruction generation part 2 assumes that the foregoing blade server is the less-heated blade server (Operation 57). Thus, among the blade servers having structure data 24 and business data 23 satisfying the conditions indicated in the allocation policy P, the blade server exhibiting the lowest temperature can be extracted as the less-heated blade server.

In the present embodiment, among the blade servers in which the business application A is activated, that have free memory size of 512 MB or more, and in which the operating entity is not Company A, the blade server exhibiting the lowest temperature is extracted as the less-heated blade server.

The instruction generation part 2 generates an instruction for relocating software running in the overheated blade server extracted in the process shown in FIG. 6 to the less-heated blade server (Operation 61). Here, the overheated blade server extracted in the process shown in FIG. 6 is the blade server in which the business application A is activated. The instruction generation part 2 generates, for instance, an instruction for stopping the process executed by the business application A in the overheated blade server, and an instruction for causing the foregoing process to be executed by the business application A in the less-heated blade server. Since the business application A has been activated in the less-heated blade server, it is unnecessary for the instruction generation part 2 to generate an instruction directed to the less-heated blade server for installing the business application A and activating the same therein.

The instructions generated by the instruction generation part 2 are transmitted to the overheated blade server and the less-heated blade server, respectively, by the instruction part 8, whereby the software having run in the overheated blade server is caused to run in the less-heated blade server.

For instance, in the case where the process executed by the overheated blade server is batch processing, it is possible that the batch processing at the overheated blade server is stopped and the reminder of the processing is executed by the less-heated blade server. Further, in the case where the process executed by the overheated blade server is on-line processing, for instance, session management data in the on-line processing are stored in a shared memory of the blade servers 12a to 12g so as to provide a session management server for managing sessions of the on-line processing executed by the blade servers 12a to 12g. By doing so, it is possible that the process in the overheated blade server is switched to the process in the less-heated blade server, with the sessions being maintained.

Next, processing in the case where none of the blade servers 12a to 12g has activation data satisfying the conditions indicated in the allocation policy (Operation 51: Yes) is described. The instruction generation part 2 extracts a blade server exhibiting the lowest temperature among the blade servers 12a to 12g as the less-heated blade server (Operation 58). The instruction generation part 2 generates an instruction for relocating software running in the overheated blade server extracted in the process shown in FIG. 6 to the less-heated blade server (Operation 62). The instruction generation part 2 generates, for instance, an instruction for stopping the process executed by a business application A in the overheated blade server, an instruction for installing the business application A for executing the foregoing process in the less-heated blade server and activating the same, and an instruction for causing the foregoing process to be executed by the software in the less-heated blade server.

It should be noted that the instruction generated by the instruction generation part 2 is not limited to the foregoing instruction. For instance, an instruction for copying the entire data stored in a storage unit of the overheated blade server into a storage unit of the less-heated blade server may be generated.

As has been described above, through the process shown in FIG. 7, the instruction generation part 2 is capable of extracting an overheated blade server based on temperature data and operation data and generating an instruction for relocating software in the overheated blade server to the less-heated blade server. It should be noted that according to the process shown in FIG. 7, a less-heated blade server is extracted based on temperature data and operation data, but a less-heated blade server may be extracted based on either temperature data or operation data.

Thus, in the case where a part of the plurality of blade servers 12a to 12g is operated intensively and heat is generated therefrom, through the processes shown in FIGS. 2, 6, and 7, the management system 1 is capable of allowing the operations executed by the foregoing part of the blade servers to be executed by other blade servers. As a result, energy for cooling is saved as a whole, whereby an effect of decreasing the air conditioning cost can be achieved.

This effect is described with reference to FIGS. 8A, 8B, and 8C. FIG. 8A is a bar chart illustrating a temperature distribution in the blade servers 12a to 12g shown in FIG. 1 at a certain time. The longitudinal axis indicates temperature, while the transversal axis indicates the blade servers 12a to 12g. FIG. 8B is a graph showing the activation/deactivation of the business application A in each blade server at the foregoing time. In the graph, "ON" indicates that the blade server concerned is activated, and "OFF" indicates that the blade server concerned is deactivated. With operation statuses in FIG. 8B, it is shown that the business application A is activated in the blade servers 12a, 12b, and 12c.

The temperature distribution shown in FIG. 8A shows that the temperature of the blade server 12b is highest among the blade servers 12a to 12g, and the blade servers 12a, 12b, and 12c radiate more heat, as compared with the blade servers 12d to 12g. In this state, it is necessary to upgrade the cooling function of the air conditioner 15a for cooling the blade servers 12a, 12b, and 12c. However, the upgrading of the cooling function of the air conditioner 15a increases the power consumption.

Here, a case where the management system 1 executes the processes shown in FIGS. 2, 6, and 7 when the state is as shown in FIGS. 8B and 8C is described. The instruction generation part 2 extracts, as the overheated blade server, the blade server 12b exhibiting the highest temperature among the blade servers 12a, 12b, and 12c in which the business application A is activated. Besides, the instruction generation part 2 extracts, as the less-heated blade server, the blade server 12g exhibiting the lowest temperature among the blade servers 12d, 12e, 12g, and 12g in which the business application A is deactivated. It should be noted that, for simplification, descriptions regarding the determinations with respect to business data, load data, and structure data are omitted here.

The instruction generation part 2 generates an instruction for causing the business application A as a part of software running in the blade server 12b as the over-heated blade server to operate in the less-blade server. The instruction part 8 transmits the foregoing instruction to the blade server 12b and the blade server 12g, thereby allowing the business application A operating in the blade server 12b as the overheated blade server to operate in the blade server 12g as the less-blade server. As a result, the temperature distribution around the blade servers 12a to 12b changes to that shown in FIG. 8C. Thus, with shift of a part of heat emission from the blade servers 12a, 12b, and 12c to the blade server 12g that has emitted less heat relative to the others, the temperature rise in the blade servers 12a, 12b, and 12c is decelerated. This makes the upgrading of the cooling function of the air conditioners 15a and 15b unnecessary, enables the saving of electric power, and reduces the overall electric power cost. Therefore, in the IDC, the management system 1 makes it possible to meet a requirement of reducing the power consumption while keeping a necessary operation level of computers surely.

It should be noted that in the description of the processes shown in FIGS. 2, 6, and 7, a case where the process by the business application A is relocated from the overheated blade server to the less-heated blade server is described, as an exemplary process for causing software running in a blade server to run in another blade server. However, software running in a blade server sometimes include, in addition to the business application A, a plurality of other applications: for instance, an application for personnel management and an application for accounting operate in one blade server. In such a case, the instruction generation part 2 may generate an instruction for relocating all the applications to another blade server, or alternatively generate an instruction for relocating only a part of the applications to another blade server. Besides, for instance, the instruction generation part 2 may generate an instruction for copying data stored in a storage unit of the overheated blade server into a storage unit of the less-heated blade server.

It should be noted that the description of the present embodiment has described the configuration and operation of the management system as an aspect of the present invention, but a program for causing a computer to execute a process shown in FIG. 2 and a computer-readable storage medium storing such a program, for instance, are also aspects of the present invention. This applies to embodiments described below.

Embodiment 2

Embodiment 1 is based on the premise that one OS is installed in one blade server, but there is software, such as Xen, VMWare, etc., that activates a plurality of OSes in one blade server, thereby allowing the physically single blade server to be used as a plurality of logical machines. Therefore, in some cases, a virtualization technology with which one blade server is treated as a plurality of virtual machines is applied. There is also a virtualization technology with which a plurality of blade servers are treated as a single virtual machine.

Therefore, the description of the present embodiment describes a case where software allocated to a plurality of blade servers virtually treats the plurality of blade servers as one machine, and a case where software allocated to one blade server treats the blade server as a plurality of virtual machines.

Figure 9A:
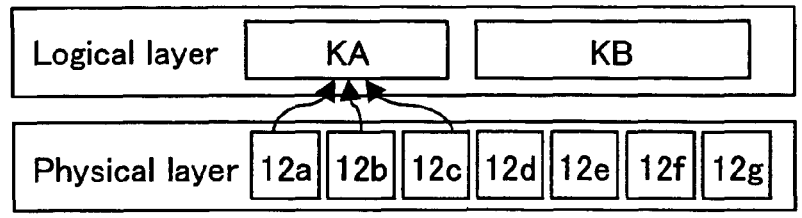
FIG. 9A is a conceptual view of blade servers and virtual machines according to Embodiment 2.

First, a case where software for performing processing with use of the blade servers 12a to 12g shown in FIG. 1 treats a plurality of blade servers as one virtual machine in a logical layer is described. The configuration of the management system according to the present embodiment is identical to the configuration of the management system 1 shown in FIG. 1. FIG. 9A is a conceptual diagram showing a concept of the blade servers 12a to 12g shown in FIG. 1 and the virtual machine.

In the example shown in FIG. 9A, among the blade servers 12a to 12g, the blade servers 12a, 12b, and 12c are treated as a virtual machine KA, while the blade servers 12d, 12e, 12f, and 12g are treated as a virtual machine KB. In such a case, the management system 1 preferably takes notice on the configuration of the blade servers 12a to 12g as physical machines, acquires operation data and temperature data as to each of the blade servers 12a to 12g, and generates instructions for the blade servers 12a to 12g.

Figure 9B:
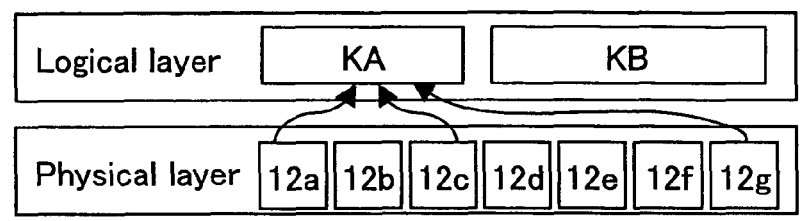
FIG. 9B shows a state after software relocation with respect to the blade servers and the virtual machines shown in FIG. 9A.

For example, loads on the blade servers 12a, 12b, and 12c increase due to an increase in an operation amount of the virtual machine KA, as compared with loads on the other blade servers 12d to 12g. The following describes this case. The instruction generation part 2 extracts the blade server 12b as the overheated blade server, and extracts the blade server 12g as the less-heated blade server, through Operations 1 to 5 illustrated in FIG. 2. The instruction generation part 2 generates an instruction for relocating a process executed by software running in the blade server 12a to software running in the blade server 12g, and the instruction part 8 outputs the instruction. This allows the blade servers 12a, 12b, and 12g to operate as the virtual machine KA (see FIG. 9B). With this, a part of heat emission by the blade server 12b is shifted to the blade server 12g, whereby the temperature rise in the blade server 12b is decelerated.

Next, a case where the software for performing processing with use of the blade servers 12a to 12g shown in FIG. 1 treats one blade server as a plurality of virtual machines in a logical layer is described.

Figure 10A:
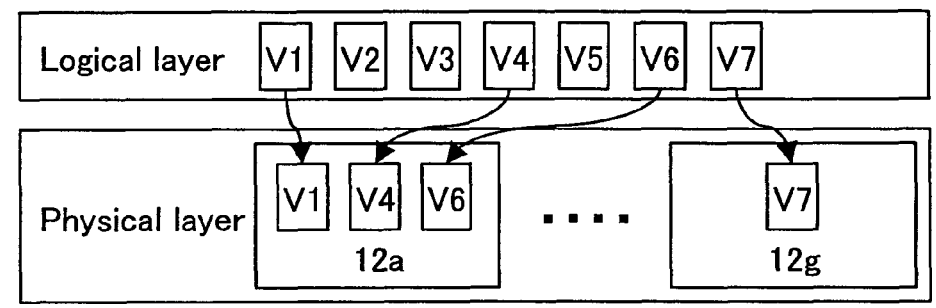
FIG. 10A is another conceptual view of blade servers and virtual machines according to Embodiment 2.

FIG. 10A is a conceptual view of blade servers and a plurality of virtual machines in the case where one blade server is treated as a plurality of virtual machines in a logical layer. In FIG. 10A, the blade server 12A is treated as virtual machines V1, V4, and V6 in the logical layer, while the blade server 12g is treated as a virtual machine V7 in the logical layer. It should be noted that in FIG. 10A the illustration of blade servers 12b to 12f present between the blade servers 12a and 12g is omitted for convenience in illustration.

In FIG. 10A, for instance, increases in operation amounts of the virtual machines V1, V4, and V6 cause a load on the blade server 12a to increase, as compared with the other blade servers 12b to 12g. The following describes this case. In this case also, the instruction generation part 2 extracts the blade server 12a as the overheated blade server and extracts the blade server 12g as the less-heated blade server, through a process identical to that shown in FIG. 2, and generates an instruction. Regarding the details of the process shown in FIG. 2, descriptions of the same operations as those in Embodiment 1 are omitted herein.

Figure 11:
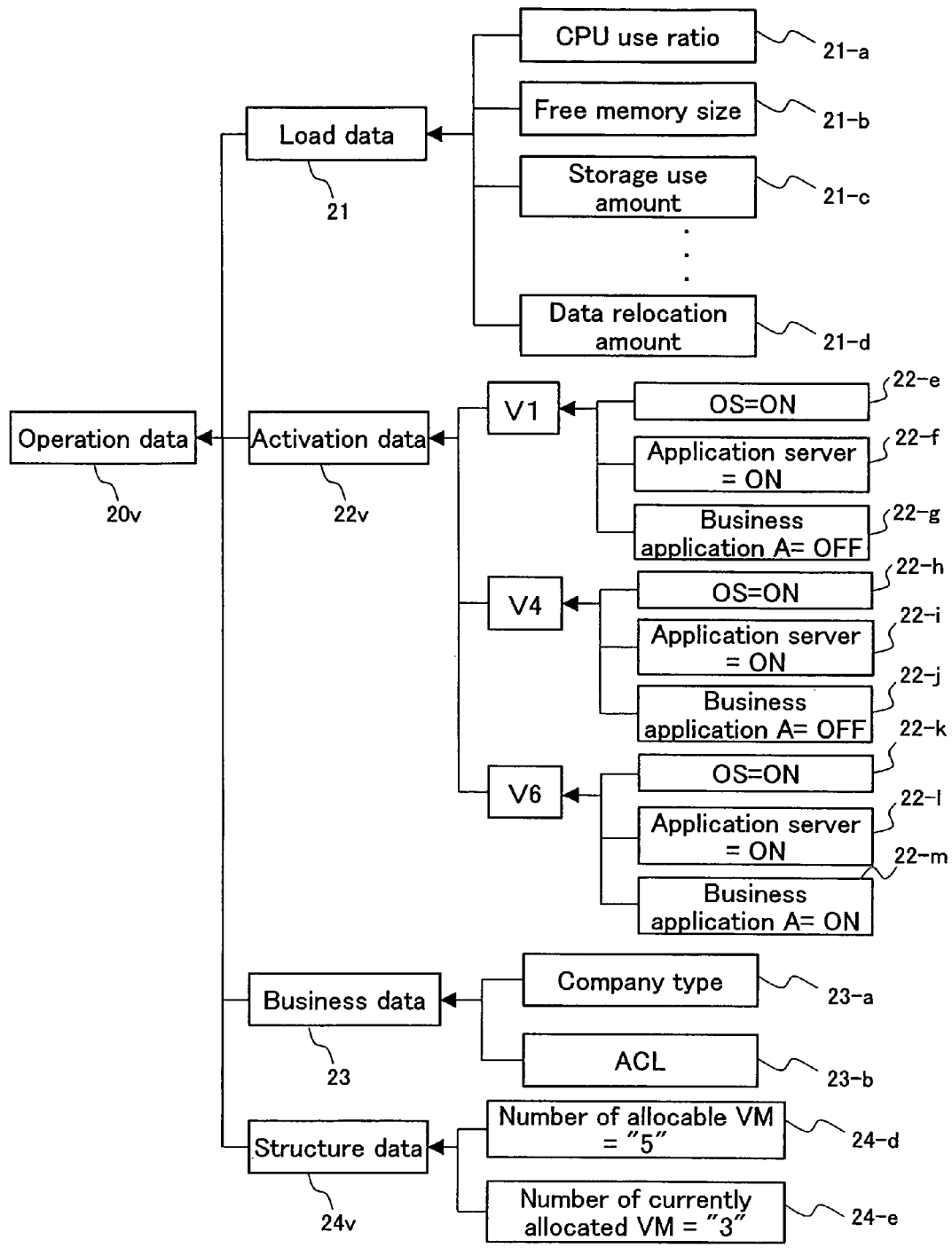
FIG. 11 is an example of operation data according to Embodiment 2.

FIG. 11 show exemplary operation data of the blade server 12a that are read in by the instruction generation part 2 in Operation 2 in the present embodiment. In the example shown in FIG. 11, the same portions as those of the data shown in FIG. 3 are designated by the same reference numerals and descriptions of the same are omitted. Activation data 22v in operation data 20v shown in FIG. 11 include data 22-e to 22-m indicating respective activation/deactivation statuses of OSes, application servers, and business applications in the virtual machines V1, V4, and V6. Structure data 24v include data 24-d indicating an upper limit of the number of virtual machines (VM) that can be allocated to one blade server, and data 24-e indicating the number of virtual machine (VM) currently allocated to the blade server 12a.

Figure 12:
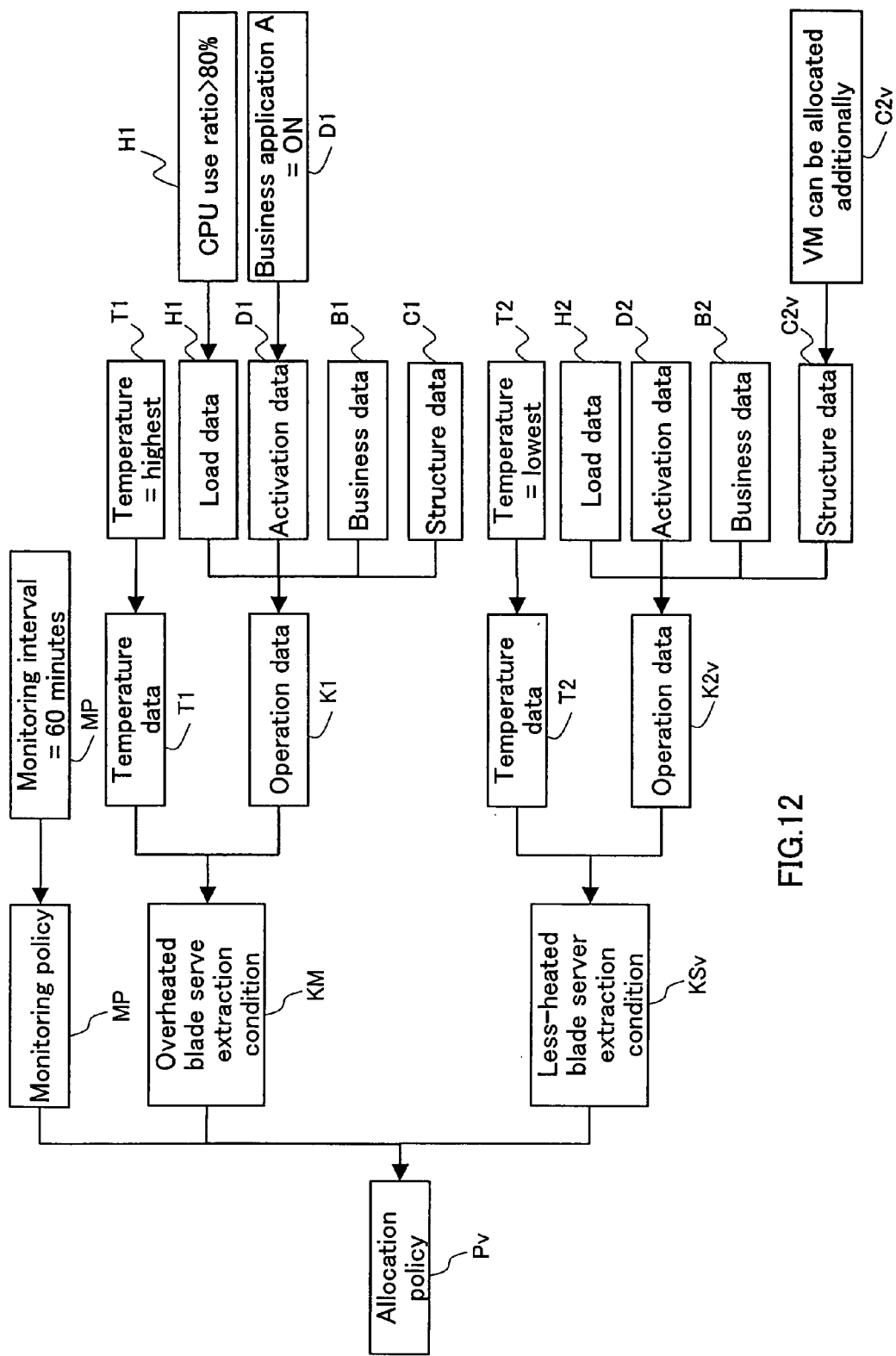
FIG. 12 is an example of an allocation policy according to Embodiment 2.

FIG. 12 shown an exemplary allocation policy that is read in by the instruction generation part 2 in Operation 3 in the present embodiment. In the example shown in FIG. 12, the same portions as those of the data shown in FIG. 4 are designated by the same reference numerals and descriptions of the same are omitted. In an allocation policy Pv shown in FIG. 12, structure data C2v of a less-heated blade server extraction condition KSv include data indicating that the less-heated blade server has to satisfy a condition that it should allow for additional allocation of a virtual machine (VM) thereto.

Figure 13:
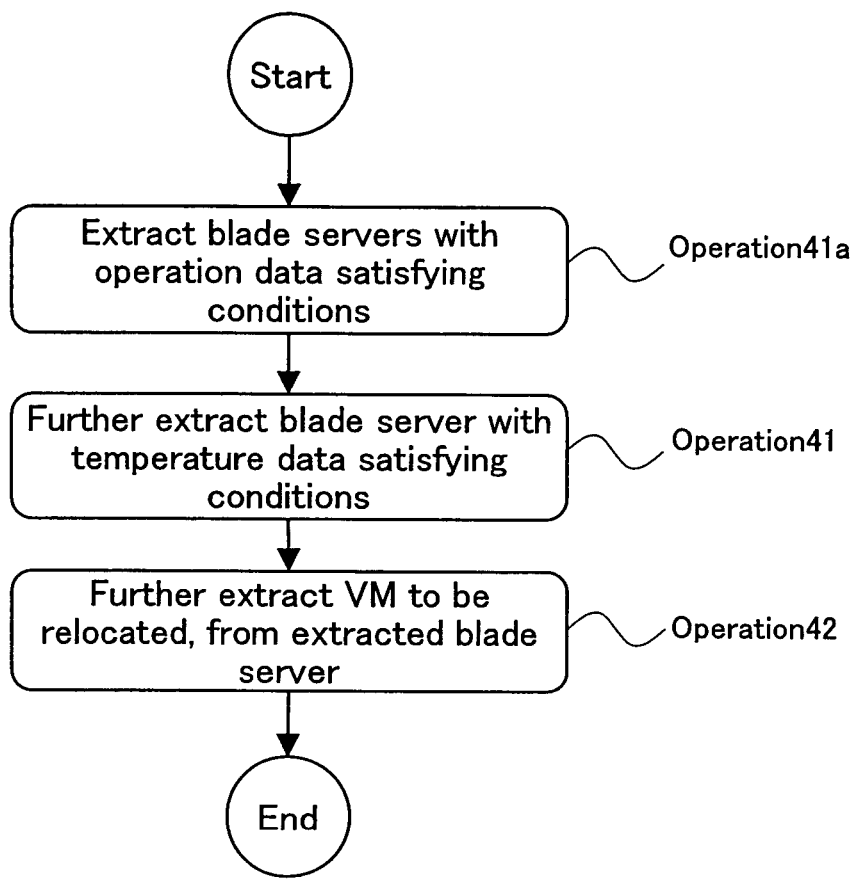
FIG. 13 is a flowchart of a process through which an overheated blade server is extracted according to Embodiment 2.

Here, the following describes an exemplary process in which the instruction generation part 2 extracts the overheated blade server by using the operation data 20v shown in FIG. 11 and the allocation policy Pv shown in FIG. 12, in Operation 4 in FIG. 2. FIG. 13 is a flowchart showing an exemplary process through which the instruction generation part 2 extracts an overheated blade server. The instruction generation part 2 first extracts, as an overheated blade server, a blade server having operation data that satisfy the conditions shown in the allocation policy (Operation 41a). Since the condition shown in the load data H1 of the allocation policy Pv shown in FIG. 12 regarding the overheated blade server is that the CPU use ratio is not less than 80%, blade servers exhibiting CPU ratios of not less than 80%, respectively, are extracted as overheated blade server candidates, from the blade servers 12a to 12g.

Next, the instruction generation part 2 extracts, as the overheated blade server, a blade server exhibiting temperature data indicating the highest temperature among the candidates extracted in Operation 41a (Operation 42). Here, an exemplary case where the blade server 12a is extracted as the overheated blade server is described. The instruction generation part 2 extracts a virtual machine to be relocated to a less-heated blade server from the virtual machines V1, V4, and V6 allocated to the overheated blade server 12a (Operation 43). Here, since activation data D1 of the allocation policy Pv indicate that a condition is that the business application is activated, the virtual machine V6 in which the business application is activated is extracted.

Figure 14:
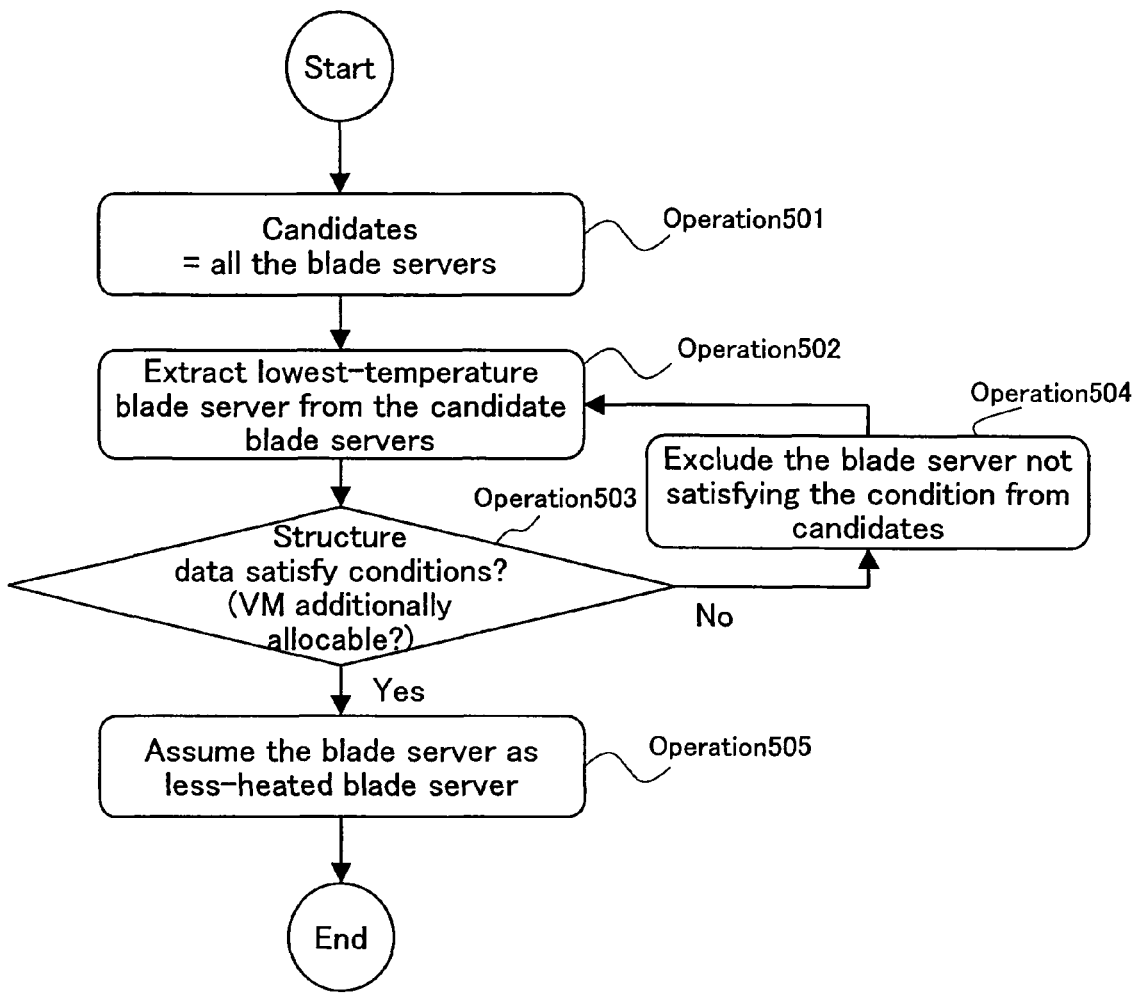
FIG. 14 is a flowchart of a process through which a less-heated blade server is extracted according to Embodiment 2.

After the overheated blade server and the virtual machine to be relocated are extracted, the instruction generation part 2 extracts a less-heated blade server to which the virtual machine is relocated (Operation 5 in FIG. 2). FIG. 14 is a flowchart showing an exemplary process through which the instruction generation part 2 extracts a less-heated blade server. As shown in FIG. 14, the instruction generation part 2 first treats all the blade servers 12a to 12g as less-heated blade server candidates (Operation 501), and then, extracts a blade server exhibiting the lowest temperature from the foregoing candidates (Operation 502).

The instruction generation part 2 determines whether or not the blade server thus extracted satisfies the condition of the structure data C2v of the allocation policy Pv (Operation 503). Since the condition of the structure data C2v of the allocation policy Pv indicates a requirement that a virtual machine can be allocated additionally, the instruction generation part 2 determines whether or not the blade server thus extracted allows for additional allocation of a virtual machine, by referring to the structure data 24v of the foregoing blade server. For instance, the instruction generation part 2 compares data 24-d contained in the structure data 24v as shown in FIG. 11 that represent the number of virtual machines allocatable to the blade server with data 24-e representing the number of virtual machines currently allocated to the blade server, thereby determining whether or not a virtual machine is allocatable thereto additionally.

In the case where the blade server extracted in Operation 502 allows for additional allocation of a virtual machine (Operation 503: Yes), the instruction generation part 2 assumes the foregoing blade server as the less-heated blade server (Operation 504). In the case where the extracted blade server does not allow for additional allocation of a virtual machine (Operation 503: No), the instruction generation part 2 excludes the foregoing blade server from the candidates (Operation 504), and extracts a blade server exhibiting the lowest temperature from the remaining candidates after the exclusion (Operation 502). Through the foregoing operations 501 to 505, the blade server exhibiting the lowest temperature is extracted as a less-heated blade server from the blade servers that allow for additional allocation of a virtual machine. Here, an exemplary case is assumed in which the blade server 12g is extracted as the less-heated blade server.

Figure 10B:
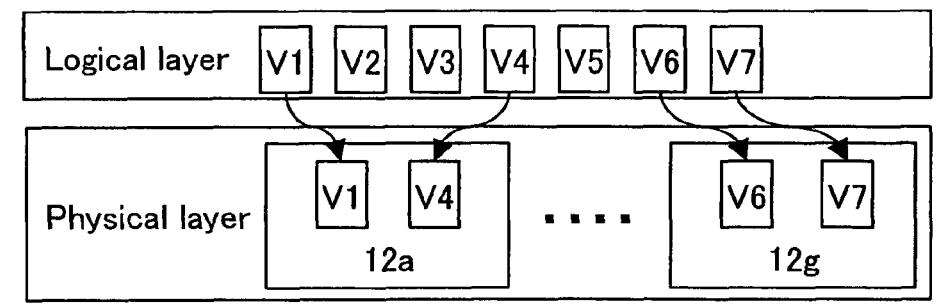
FIG. 10B is a state after software relocation with respect to the blade servers and the virtual machines shown in FIG. 9A.

The instruction generation part 2 determines the less-heated blade server through the process shown in FIG. 14, and generates an instruction for relocating the virtual machine V6 of the overheated blade server 12a extracted in Operation 4 shown in FIG. 2 to the less-heated blade server 12g (Operation 6 in FIG. 2). The instruction part 8 feeds the instruction generated by the instruction generation part 2 to the overheated blade server 12a and the less-heated blade server 12g (Operation 7 in FIG. 2), whereby the virtual machine V6 allocated to the blade server 12a can be relocated to the blade server 12g. FIG. 10B show a state in which the virtual machine V6 having been allocated to the blade server 12a is relocated to the blade server 12g. The virtual machine V6 that operated in the blade server 12a is now operating in the blade server 12g. By so doing, the heat emission of the blade server 12a is reduced.

Embodiment 3

Another embodiment of the present invention is described below with reference to the drawings. The configurations having the same functions as the configurations of Embodiment 1 described above are designated with the same reference numerals and descriptions of the same are omitted.

Figure 15:
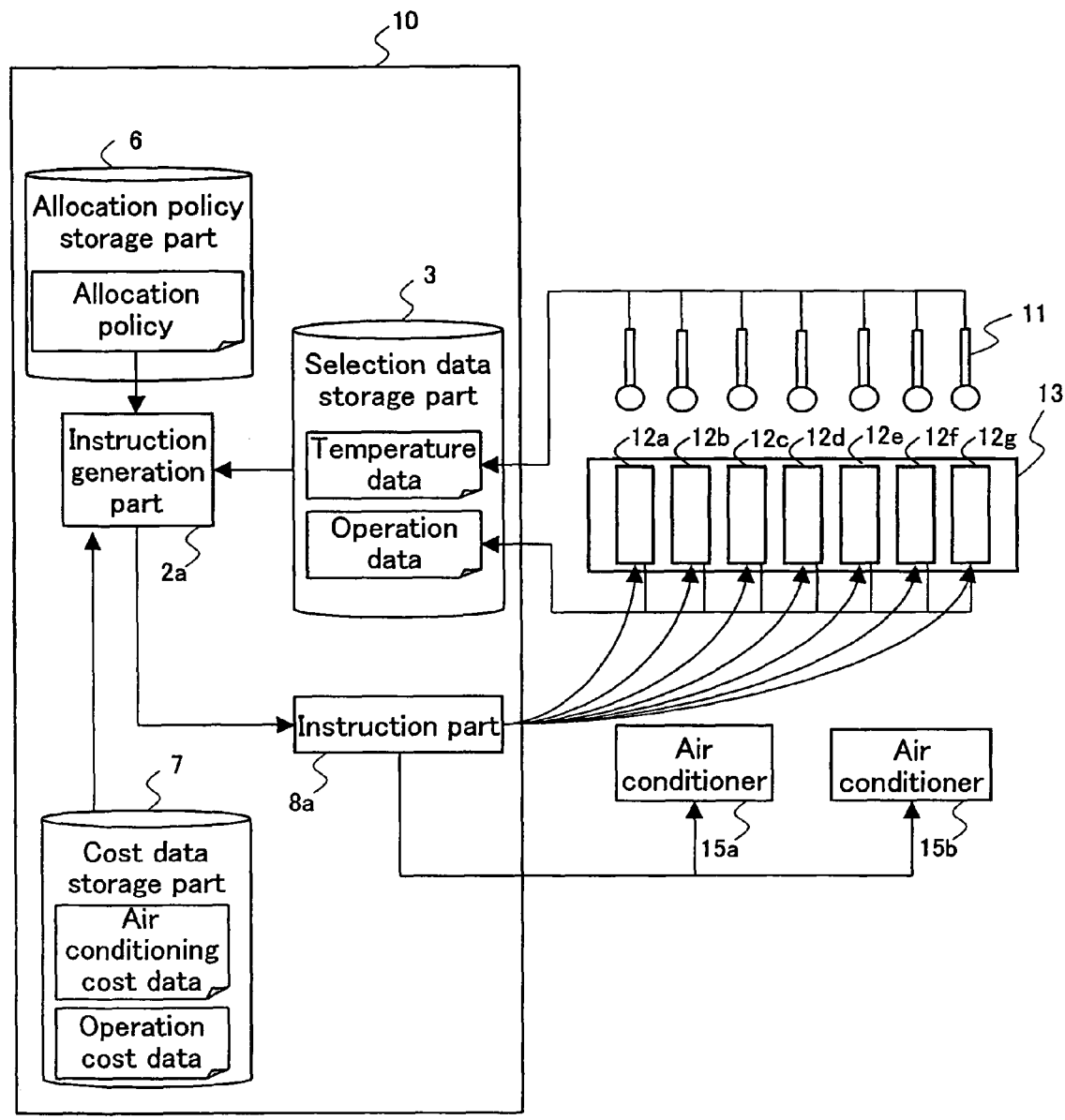
FIG. 15 is a functional block diagram illustrating a configuration of an IDC including a management system according to Embodiment 3.

FIG. 15 is a functional block diagram illustrating a configuration of an IDC including a management system 10 according to the present embodiment. The management system 10 shown in FIG. 15 has a configuration obtained by modifying the management system 1 (FIG. 1) according to Embodiment 1 by further including a cost data storage part 7 therein. An instruction generation part 2a generates an instruction based on data stored in the cost data storage part 7 also, in addition to temperature data, operation data, and an allocation policy. The instruction generation part 2a also generates instructions directed to the air conditioners 15a and 15b. An instruction part 8a transmits the instructions for the air conditioners 15a and 15b generated by the instruction generation part 2a to the air conditioners 15a and 15b.

The cost data storage part 7 stores air conditioning cost data and operation cost data. The air conditioning cost data are data used in calculation of an electric power cost for controlling temperatures in the blade servers 12a to 12g or temperatures in the vicinities thereof. The air conditioning cost data include, for instance, data representing a calculation formula for deriving an air conditioning cost based on values indicating the temperatures as to the blade servers 12a to 12g, coefficients and the like included in such a calculation formula, etc.

The operation cost data are data used in calculation of an electric power cost for allowing the blade servers 12a to 12g to operate according to the operations of software allocated thereto, respectively. The operation cost data include, for instance, a calculation formula for deriving an operation cost based on values indicating operation amounts of the blade servers 12a to 12g or amounts of processing by the software, coefficients included in such a calculation formula, etc.

Figure 16:
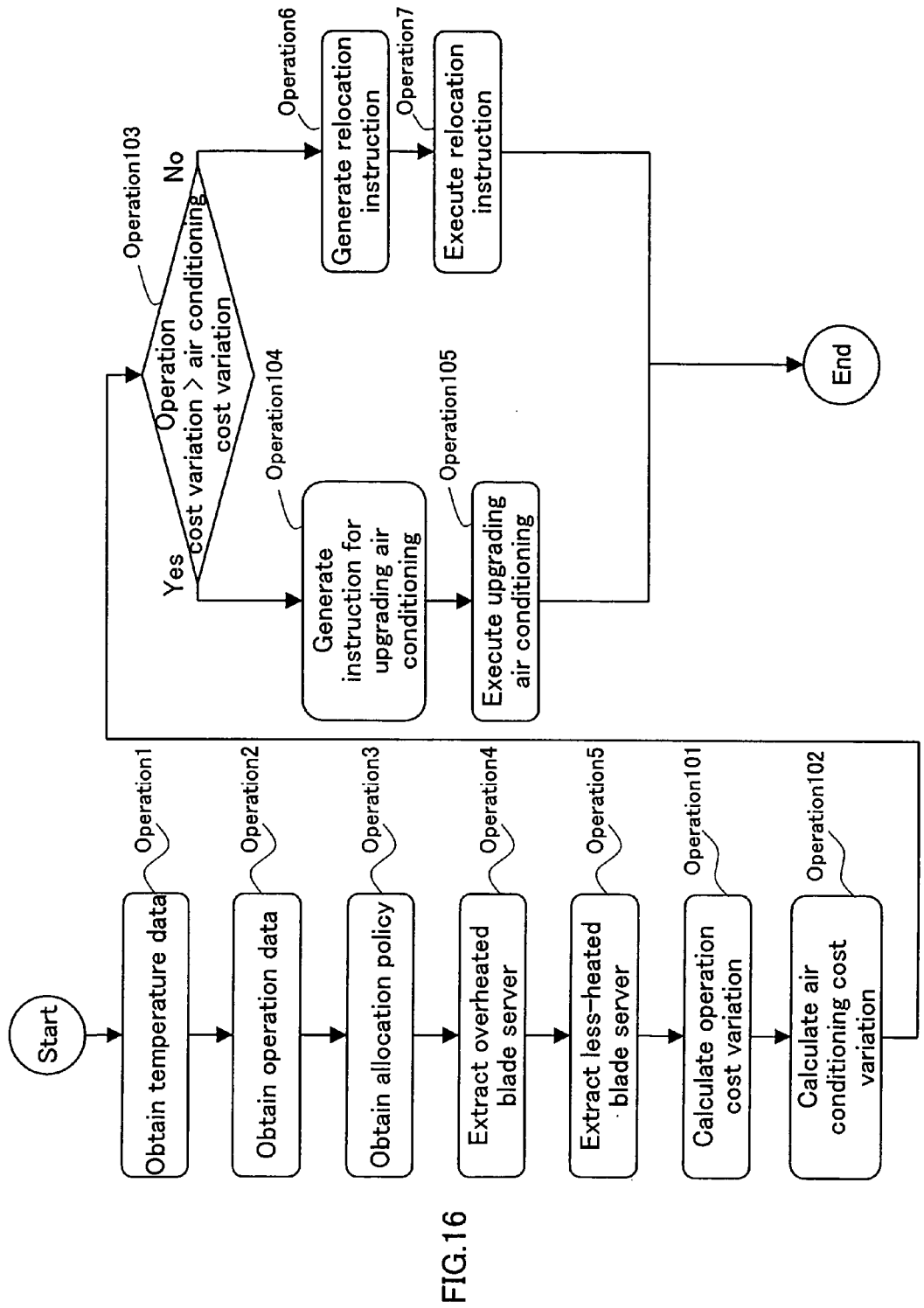
FIG. 16 is a flowchart of an operation of the management system according to Embodiment 3.

Next, a flow of operations of the management system 10 according to the present embodiment is described with reference to the flowchart shown in FIG. 16. In FIG. 16, Operations 1 to 5 are identical to Operations 1 to 5 shown in FIG. 2.

The instruction generation part 2a of the management system 10 extracts an overheated blade server (Operation 4) and a less-heated blade server (Operation 5), and thereafter, in Operation 101, calculates a variation in the operation cost in the case where software running in the overheated blade server is relocated to the less-heated blade server. In other words, the instruction generation part 2a calculates a difference between the operation cost before the relocation of the software and the operation cost after the relocation of the software.

Let a CPU use ratio before the relocation of software of a blade server contained at the i'th position in the rack 13 be xi, and let a CPU use ratio after the relocation of software of the blade server contained at the i'th position in the rack 13 be yi, then, the operation cost before the relocation and the operation cost after the relocation can be derived, for instance, by Formula 1 shown below. In Formula 1, CPU(x) is a coefficient used for calculating an operation cost of a blade server exhibiting a CPU use ratio of x. The CPU(x) in the present embodiment varies with the value of x. For this coefficient, data preliminarily stored as the operation cost data in the cost data storage part 7 can be used, for instance.

$$\text{Operation cost before relocation} = \sum_i CPU(x_i) \quad \text{[Formula 1]}$$

$$\text{Operation cost after relocation} = \sum_i CPU(y_i)$$

It should be noted that the formula for deriving the operation cost is not limited to Formula 1 shown above. Alternatively, the operation cost may be calculated by using a memory use ratio, the number of accesses, a transmitted data amount, or the like, as an amount of operation, besides the CPU use ratio. Further alternatively, in place of the coefficient CPU(x), a function for calculating an operation cost of a blade server exhibiting a CPU use ratio of x may be used.

Still further, in Operation 102, the instruction generation part 2a in the management system 10 calculates a variation in the air conditioning cost in the case where software running in the overheated blade server is caused to operate in the less-heated blade server. In other words, a difference between the air conditioning cost before the relocation of the software and the air conditioning cost after the relocation of the software is derived.

Let a temperature before relocation of software in a blade server contained at the i'th position in the rack 13 be bCi, and let a temperature after the relocation of the software in the blade server contained at the i'th position be aCi, then, the air conditioning cost before the relocation and the air conditioning cost after the relocation are derived, for instance, by Formula 2 shown in below.

$$\text{Operation cost before relocation} = \sum_i AirCond(bC_i) \quad \text{[Formula 2]}$$

$$\text{Operation cost after relocation} = \sum_i AirCond(bC_i)$$

In Formula 2 above, AirCond(C) is a coefficient used for calculating an air conditioning cost from a temperature C of the blade server. The AirCond(C) in the present embodiment varies with the value of C. For this coefficient, data preliminarily stored as the air conditioning cost data in the cost data storage part 7 can be used, for instance. Alternatively, data derived preliminarily by simulating relationship between the temperature distribution regarding a plurality of blade servers and the operation statuses of the blade servers may be used as a temperature aCi of a blade server after relocation of software. Still alternatively, temperature distribution data stored based on past operation performance of the blade servers may be used as a temperature aCi. Such data are stored preliminarily in the cost data storage part 7 as the air conditioning cost data. It should be noted that Formula 2 is a mere example, and the formula used for calculating the air conditioning cost is not limited to Formula 2.

The instruction generation part 2a compares the operation cost variation obtained in Operation 101 with the air conditioning cost variation obtained in Operation 102. If the air conditioning cost variation is larger (Operation 103: No), the instruction generation part 2a generates an instruction for relocating the software running in the overheated blade server to the less-heated blade server (Operation 6), and the instruction part 8a transmits the foregoing instruction (Operation 7). Operations 6 and 7 are identical to the operations shown in FIG. 2.

In the case where the operation cost variation is greater (Operation 103: Yes), the instruction generation part 2a generates an instruction for causing the air conditioners 15a and 15b to upgrade the air conditioning function (Operation 104). The instruction part 8a transmits the instruction to the air conditioners 15a and 15b (Operation 105).

Through the process shown in FIG. 16, the management system 10 is capable of re-allocating the pieces of software running in the blade servers 12a to 12g or controlling the air conditioners 15a and 15b so as to reduce an electric power cost. In other words, the management system 10 is allowed to upgrade the cooling in the case where the electric power cost for the upgrading of the cooling is smaller, whereas the management system 10 is allowed to relocate the pieces of software between the blade servers in the case where the electric power cost for the relocation of the software between the blade servers is smaller.

It should be noted that the process for the re-allocation of pieces of software operating in blade servers or the control of air conditioners, performed by using cost data so as to reduce an electric power cost, is not limited to the process shown in FIG. 16.

The management systems according to the present invention for managing a plurality of computers composing an IDC, described in the descriptions of Embodiments 1 to 3, are applicable in a computer center in which a plurality of computers are under centralized management, like a server firm, an application service provider center, etc. Besides, the plurality of computers provided in such a computer center may respectively have enclosures so as to be independent from one another, or alternatively, the plurality of computers may be arranged on the same substrate.

In the description of Embodiments 1 to 3, the case where a computer composing hardware is a blade server is described, but a computer is not limited to a blade server. For instance, a computer may be a tower-type server, a rack-mount-type server, a personal computer, etc. also are included in examples of computers as management targets of the management system according to the present invention.

The present invention is advantageous as a management system capable of saving energy for cooling a plurality of computers composing an IDC or the like.

It should be noted that the embodiments described above are shown as mere examples of the present invention, and the present invention should not be interpreted limitedly according to the foregoing embodiments. The scope of the present invention is indicated by claims rather than by the embodiments described above, and all changes which come within the meaning and range of equivalency of the claims are intended to be embraced therein.

What is claimed is:

1. A management system for, in a computer center in which a plurality of computers including hardware are provided, managing the computers and pieces of software allocated to and executed by the computers, respectively, the management system comprising:

a selection data storage unit to store data regarding allocation destination selection, the data including at least one of operation data and temperature data, wherein the operation data including sets of operation data, each set representing a load applied to each computer by each software allocated thereto, and the temperature data represent temperature distribution in the computers;

an instruction generation unit to extract, from the computers, an overheated computer in which at least one of the load represented by the operation data and the temperature represented by the temperature data satisfies a predetermined overheated condition for determining the overheated computer that emits more heat as compared with the other computers, and a less-heated computer in which at least one of the load represented by the operation data and the temperature represented by the temperature data satisfies a predetermined less-heated condition for determining the less-heated computer that emits less heat as compared with the other computers and generate an instruction for relocating at least a part of the piece of software allocated to and executed by the overheated computer to the less-heated computer; and an instruction unit for outputting the instruction, wherein the instruction generation unit extracts the overheated computer and the less-heated computer according to a condition that computers whose distance is less than a predetermined amount should not be extracted as the overheated computer and the less-heated computer.

2. The management system according to claim 1, wherein each set of the operation data includes load data representing a load applied to the computer when the computer executes the piece of software allocated thereto.

3. The management system according to claim 1, wherein each set of the operation data includes operating entity data about an operating entity that performs business operations by utilizing the computer and the piece of software allocated thereto.

4. The management system according to claim 1, wherein each set of the operation data includes activation data representing a state of activation of the piece of software activated by the computer to which the piece of software is allocated.

5. The management system according to claim 1, wherein each set of the operation data includes structure data representing at least either one of a structure of the hardware of the computer and a structure of the piece of software allocated thereto.

6. The management system according to claim 1, further comprising an allocation policy storage part to store an allocation policy in an updatable state, the allocation policy including data representing a condition of a state of execution of software by a computer under which the computer is determined to be an overheated computer, and a condition of a state of execution of software by a computer under which the computer is determined to be a less-heated computer, wherein the instruction generation unit extracts the overheated computer and the less-heated computer based on the conditions indicated by the allocation policy and the states of execution of the software by the computers indicated by the operation data, and generates the instruction.

7. The management system according to claim 6, wherein the allocation policy further include data representing a condition of temperature under which a computer is determined to be an overheated computer, and a condition of temperature under which a computer is determined to be a less-heated computer, wherein the instruction generation unit extracts the overheated computer and the less-heated computer based on the conditions indicated by the allocation policy and temperature distribution indicated by the temperature data, and generates the instruction.

8. The management system according to claim 1, further comprising a cost data storage part for storing cost data, the cost data including air conditioning cost data used in calculation of an air conditioning cost for controlling temperatures in the computers or in the vicinities thereof, and operation cost data used in calculation of an operation cost for operating the computers, wherein the instruction generation unit extracts the overheated computer and the less-heated computer by using the data regarding allocation destination selection, and calculating an air conditioning cost as well as an operation cost in the case where at least a part of the software allocated to the overheated computer is relocated to the less-heated computer, by using the cost data, and generates the instruction in the case where it determines from the air conditioning cost and the operation cost that an electric power cost can be reduced by relocating at least a part of the piece of software allocated to the overheated computer to the less-heated computer.

9. The management system according to claim 1, wherein each set of the operation data includes structure data representing a position where the blade server is disposed, and
the instruction generation unit extracts the overheated computer and the less-heated computer so that the distance between the overheated computer and the less-heated computer derived from the structure data satisfies a predetermined condition of a distance.

10. A non-transitory computer readable storage medium storing a management program for causing a management computer to execute processing for, in a computer center in which a plurality of computers including hardware are provided, managing the computers and pieces of software allocated to and executed by the computers, respectively, the management program allowing the management computer to execute:
selection data reading processing for reading data regarding allocation destination selection from a storage part of the management computer, the data regarding allocation destination selection including at least either one of operation data and temperature data, wherein the operation data include sets of operation data that represent a load applied to each computer by each software allocated thereto, and temperature data represent temperature distribution in the computers;
instruction generating processing for extracting, from the computers, an overheated computer in which at least one of the load represented by the operation data and the temperature represented by the temperature data satisfies a predetermined overheated condition for determining the overheated computer that emits more heat as compared with the other computers, and a less-heated computer in which at least one of the load represented by the operation data and the temperature represented by the temperature data satisfies a predetermined less-heated condition for determining the less-heated computer that emits less heat as compared with the other computers and generating an instruction for relocating at least a part of the piece of software allocated to the overheated computer to the less-heated computer; and
instructing processing for outputting the instruction,
wherein the overheated computer and the less-heated computer are extracted according to a condition that computers whose distance is less than a predetermined amount should not be extracted as the overheated computer and the less-heated computer.

11. A management method for, in a computer center in which a plurality of computers including hardware are provided, managing the computers and pieces of software allocated to and executed by the computers, respectively, by using a management computer, the method comprising:
an operation executed by an instruction generation unit provided in the management computer for reading data regarding allocation destination selection from a storage part of the management computer, the data regarding allocation destination selection including at least either one of operation data and temperature data, wherein the operation data include sets of operation data that represent a load applied to each computer by each software allocated thereto and temperature data represent temperature distribution in the computers;
an operation executed by the instruction generation unit provided in the management computer for extracting, from the computers, an overheated computer in which at least one of the load represented by the operation data and the temperature represented by the temperature data satisfies a predetermined overheated condition for determining the overheated computer that emits more heat as compared with the other computers, and a less-heated computer in which at least one of the load represented by the operation data and the temperature represented by the temperature data satisfies a predetermined less-heated condition and generating an instruction for relocating at least a part of the piece of software allocated to the overheated computer to the less-heated computer for determining the less-heated computer that emits less heat as compared with the other computers; and
an operation executed by an instruction unit provided in the management computer for outputting the instruction,
wherein the instruction generation unit extracts the overheated computer and the less-heated computer according to a condition that computers whose distance is less than a predetermined amount should not be extracted as the overheated computer and the less-heated computer.

* * * * *